(12) United States Patent
Potyrailo et al.

(10) Patent No.: US 12,540,909 B2
(45) Date of Patent: Feb. 3, 2026

(54) SENSING SYSTEM AND METHOD

(71) Applicant: GE Infrastructure Technology LLC, Greenville, SC (US)

(72) Inventors: Radislav Alexandrovich Potyrailo, Niskayuna, NY (US); Shiyao Shan, Clifton Park, NY (US); Tianyi Wang, Clifton Park, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 133 days.

(21) Appl. No.: 18/400,302

(22) Filed: Dec. 29, 2023

(65) Prior Publication Data

US 2025/0216354 A1  Jul. 3, 2025

(51) Int. Cl.
*G01N 27/12* (2006.01)

(52) U.S. Cl.
CPC .................. *G01N 27/124* (2013.01)

(58) Field of Classification Search
USPC ......................................... 324/693
See application file for complete search history.

(56) References Cited

U.S. PATENT DOCUMENTS

| | | |
|---|---|---|
| 5,345,213 A | 9/1994 | Semancik et al. |
| 6,095,681 A | 8/2000 | Kunt et al. |
| 7,329,389 B2 | 2/2008 | Horovitz et al. |
| 7,911,345 B2 | 3/2011 | Potyrailo et al. |
| 9,030,329 B2 | 5/2015 | Rutherford et al. |

(Continued)

FOREIGN PATENT DOCUMENTS

| | | |
|---|---|---|
| EP | 3879266 A1 | 9/2021 |
| EP | 4166942 A1 | 4/2023 |

(Continued)

OTHER PUBLICATIONS

International Search Report & Written opinion for PCT Application No. PCT/US2024/062041, Mailed Apr. 2, 2025, 14 Pages.

(Continued)

*Primary Examiner* — Farhana A Hoque
(74) *Attorney, Agent, or Firm* — Fletcher Yoder, P.C.

(57) ABSTRACT

A detector system may include a sensing element including a substrate, sensing electrodes supported by the substrate, sensing material over the sensing electrodes, and a multi-energy-delivering element. The multi-energy-delivering element may be coupled to the sensing material and may deliver different types of energy to the gas sensing material. The detector system may include excitation and detection circuitry coupled to the sensing electrodes and the multi-energy-delivering element, and a controller coupled to the excitation and detection circuitry. The controller may cause the excitation and detection circuitry to achieve multi-gas differentiation with one-, two-, or higher-dimensional detection by applying an alternating current through the sensing electrodes at one or more operational frequencies for excitation of the sensing material, and applying at least one type of operational energy to the gas sensing material via the multi-energy-delivering element, wherein at least one type of operational energy has at least two levels.

23 Claims, 20 Drawing Sheets

(56) References Cited

U.S. PATENT DOCUMENTS

| | | | |
|---|---|---|---|
| 9,182,366 B2* | 11/2015 | Izawa | G01N 27/124 |
| 9,312,713 B2 | 4/2016 | Graf et al. | |
| 10,684,242 B2 | 6/2020 | Dominguez Pumar et al. | |
| 11,333,646 B2 | 5/2022 | Potyrailo | |
| 11,385,195 B2 | 7/2022 | Yoshioka et al. | |
| 11,635,416 B2 | 4/2023 | Carbonelli et al. | |
| 11,788,980 B2 | 10/2023 | Passaniti et al. | |
| 2014/0105790 A1 | 4/2014 | Gaudon et al. | |
| 2022/0341871 A1 | 10/2022 | Wohltjen | |
| 2023/0110328 A1 | 4/2023 | Carbonelli et al. | |

FOREIGN PATENT DOCUMENTS

| | | | |
|---|---|---|---|
| WO | 2020008020 A1 | 1/2020 | |
| WO | 2023043428 A1 | 3/2023 | |

OTHER PUBLICATIONS

U.S. Appl. No. 17/969,428, filed Oct. 19, 2022, Radislav Alexandrovich Potyrailo.

Potyrailo, R. A., Multivariable sensors for ubiquitous monitoring of gases in the era of Internet of Things and Industrial Internet, Chem. Rev. 2016, 116, 11877-11923.

Potyrailo, R. A.; Go, S.; Sexton, D.; Li, X.; Alkadi, N.; Kolmakov, A.; Amm, B.; St-Pierre, R.; Scherer, B.; Nayeri, M.; Wu, G.; Collazo-Davila, C.; Forman, D.; Calvert, C.; Mack, C.; Mcconnell, P., Extraordinary performance of semiconducting metal oxide gas sensors using dielectric excitation, Nat. Electron. 2020, 3, 280-289.

Heilig et al., "Gas identification by modulating temperatures of SnO2-based thick film sensors," Dec. 2, 1996, Sensors and Actuators B 43 (1997), Tubingen, Germany, pp. 45-51.

Meier et al., "Detecting Chemical Hazards with Temperature-Programmed Microsensors: Overcoming Complex Analytical Problems with Multidimensional Databases" Annual Review of Analytical Chemistry vol. 2, 2009, 24 Pages.

Zhang et al., "A novel method in the gas identification by using WO3 gas sensor based on the temperature-programmed technique," Sensors and Actuators B 206(2015), http://dx.doi.org/10.1016/j.snb.2014.09.063 , pp. 220-229.

Meier et al., "The potential for and challenges of detecting chemical hazards with temperature-programmed microsensors," Nov. 7, 2006, Gaithersburg, MD 20899-8362, USA, Sensors and Actuators B 121 (2007), pp. 282-294.

Hossein-Babaei et al., "A breakthrough in gas diagnosis with a temperature-modulated generic metal oxide gas sensor," Mar. 5, 2012, Sensors and Actuators B 166-167, pp. 419-425.

Huang et al., "Gas sensing behavior of a single tin dioxide sensor under dynamic temperature modulation," Dec. 15, 2003, doi:10.1016/j.snb.2003.12.013 , Sensors and Actuators B 99 (2004), pp. 444-450.

Gutierrez-Osuna et al., "Transient response analysis for temperature-modulated chemoresistors," Sensors and Actuators B 93 (2003), doi:10.1016/S0925-4005(03)00248-X , pp. 57-66.

Kato et al., "Temperature-dependent dynamic response enables the qualification and quantification of gases by a single sensor," Aug. 6, 1996, Sensors and Actuators B 40 (1997), pp. 33-37.

Schütze et al., "Highly Sensitive and Selective VOC Sensor Systems Based on Semiconductor Gas Sensors: How to?," Mar. 1, 2017, Environments 2017, vol. 4, Issue 20, doi:10.3390/environments4010020, 13 Pages.

Schüler et al., "Metal oxide semiconductor gas sensor self-test using Fourier-based impedance spectroscopy," Sep. 25, 2014, Journal of sensors and sensor systems, doi:10.5194/jsss-3-213-2014 , pp. 213-221.

Schüler et al., "A novel approach for detecting HMDSO poisoning of metal oxide gas sensors and improving their stability by temperature cycled operation," Oct. 19, 2015, Journal of Sensors and Sensor Systems, doi:10.5194/jsss-4-305-2015 , pp. 305-311.

Wen et al., "A Gas Mixture Prediction Model Based on the Dynamic Response of a Metal-Oxide Sensor," Sep. 11, 2019, micromachines, doi:10.3390/mi10090598 , 11 pages.

Hossein-Babaei et al., "Recognition of complex odors with a single generic tin oxide gas sensor," Dec. 24, 2013, Sensors and Actuators B 194 (2014), http://dx.doi.org/10.1016/j.snb.2013.12.061 , pp. 156-163.

Chakraborty et al., "Selective detection of methane and butane by temperature modulation in iron doped tin oxide sensors," Dec. 13, 2005, Kolkata 700032, India, Sensors and Actuators B 115 (2006), pp. 610-613.

Nakata et al., "Gas Sensing Based on a Nonlinear Response: Discrimination between Hydrocarbons and Quantification of Individual Components in a Gas Mixture," Analytical Chemistry, vol. 68, No. 13, Jul. 1, 1996, pp. 2067-2072.

Lee, A. P.; Reedy, B. J. Temperature modulation in semiconductor gas sensing, Sens. Actuators B 1999, 60, (1), 35-42.

MicroDock II Automated Instrument Docking Station 2010, http://www.honeywellanalytics.com/~/media/honeywell-analytics/products/microdock-ii/documents/english/microdockiidatasheet539614en.pdf?la=en.

Potyrailo et al., "Toward High-Value Gas Sensing In Wearable And Distrubuted Formats: Discrimination Of Complex Patterns Of Volatiles Using Multi-Response Rfid Sensors," ISOCS/IEEE International Symposium on Olfaction and Electronic Nose (ISOEN) 2017, 3 Pages.

Booksh et al., "Theory of Analytical Chemistry," Analytical Chemistry, vol. 66, No. 15, Aug. 1, 1994, American Chemical Society, 782A-791A.

Potyrailo et al., "Physical And Analytical Principles of Multivariable Gas And Liquid Sensors," IEEE Sensors, New Delhi, India, Oct. 28-31, 2018, 4 pages.

Li et al., "Discriminating gas molecules at room temperature by UV light modulation (ULM) of nonselective metal oxide sensors," Dec. 9, 2022, Sensors & Actuators: B. Chemical 378 (2023) 133115, Sensors and Actuators: B. Chemical, https://doi.org/10.1016/j.snb.2022.133115 , 8 pages.

Potyrailo et al., "First-Order Individual Gas Sensors as Next Generation Reliable Analytical Instruments," May 3, 2023, Applied Spectroscopy 2023, vol. 77(8) 860-872.

Dai et al., "Generic Approach to Boost the Sensitivity of Metal Oxide Sensors by Decoupling the Surface Charge Exchange and Resistance Reading Process," Jul. 23, 2020, ACS Applied Materials & Interfaces, https://dx.doi.org/10.1021/acsami.0c07626 , pp. 37295-37304.

Deng et al., "Temperature & light modulation to enhance the selectivity of Pt-modified zinc oxide gas sensor," Mar. 22, 2017, Sensors and Actuators B 247 (2017), http://dx.doi.org/10.1016/j.snb.2017.03.107 , pp. 903-915.

Iwata et al., "Gas discrimination based on enhanced gas-species related information obtained by a single gas sensor with novel temperature modulation," Dec. 9, 2021, Sensors & Actuators: B. Chemical 354 (2022) 131225, https://doi.org/10.1016/j.snb.2021.131225 , 10 pages.

Tonezzer, "Selective gas sensor based on one single SnO2 nanowire," Feb. 22, 2019, Sensors & Actuators: B. Chemical 288 (2019) 53-59, pp. 23-29.

Potyrailo et al., "Boosting stability of electronic multi-gas sensors," 2022 IEEE Sensors, DOI: 10.1109/SENSORS52175.2022.9967318 , GE Research, Niskayuna, NY, USA, 4 Pages.

Potyrailo et al., "Boosting stability of photonic multi-gas sensors," 2022 IEEE Sensors, DOI: 10.1109/SENSORS52175.2022.9967040 , GE Research, Niskayuna, NY, USA, 4 pages.

Letter to the Editor, "Equivalence between thermal and room temperature UV light-modulated responses of gas sensors based on individual SnO2 nanowires," Sensors and Actuators B 140 (2009), doi:10.1016/j.snb.2009.04.070 , pp. 337-341.

* cited by examiner

EXAMPLE 2
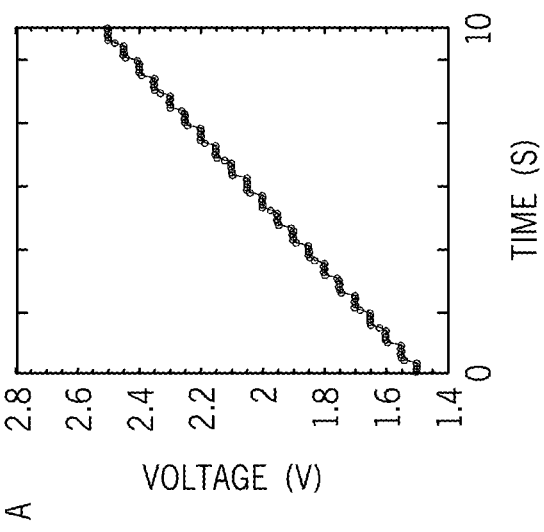
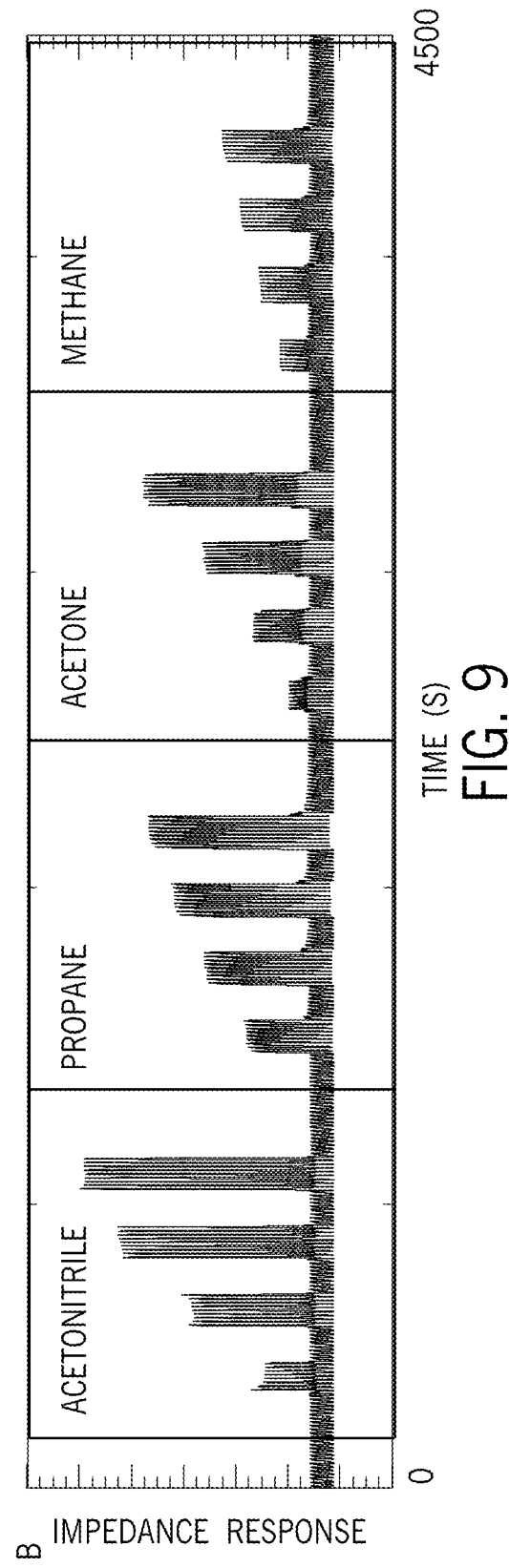
FIG. 9

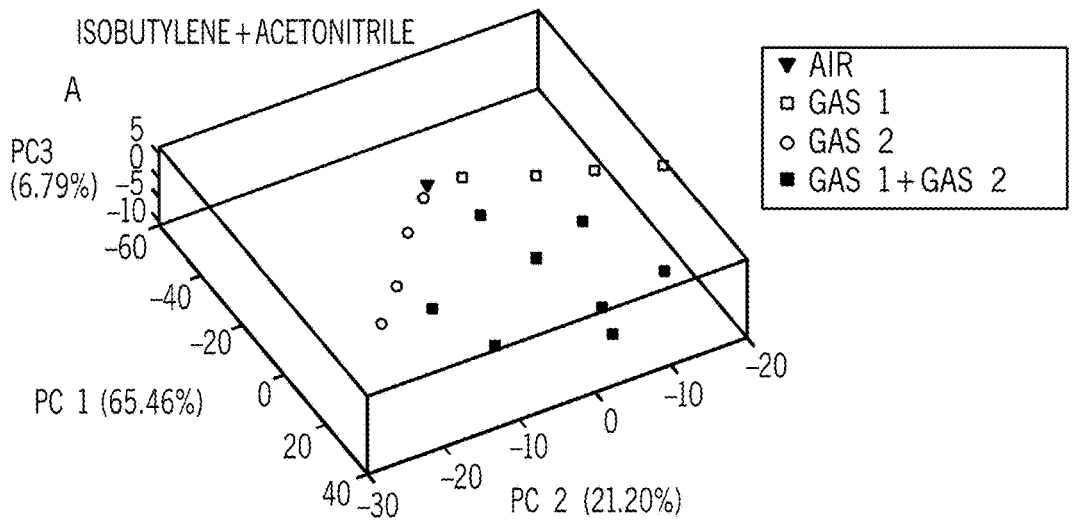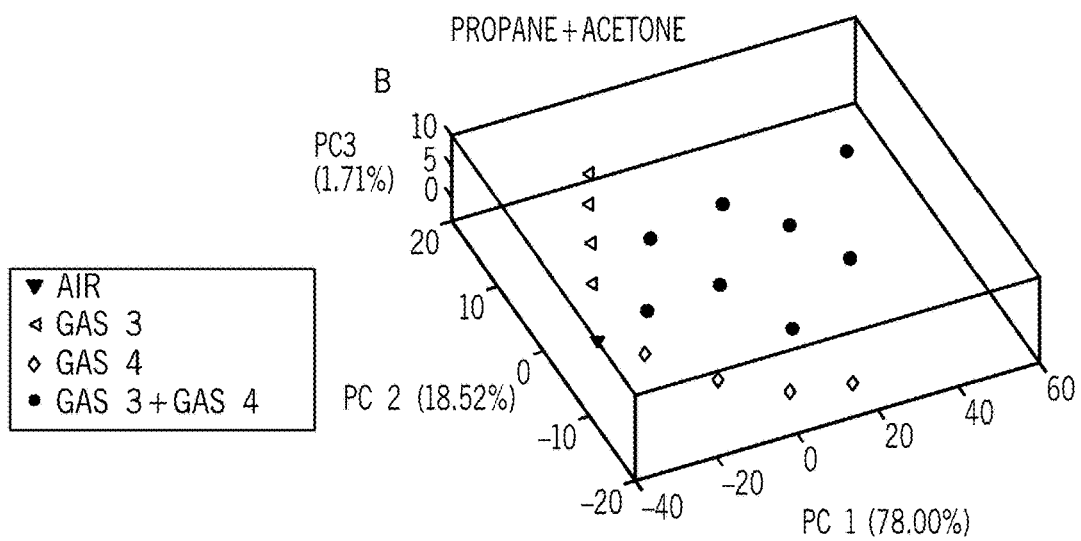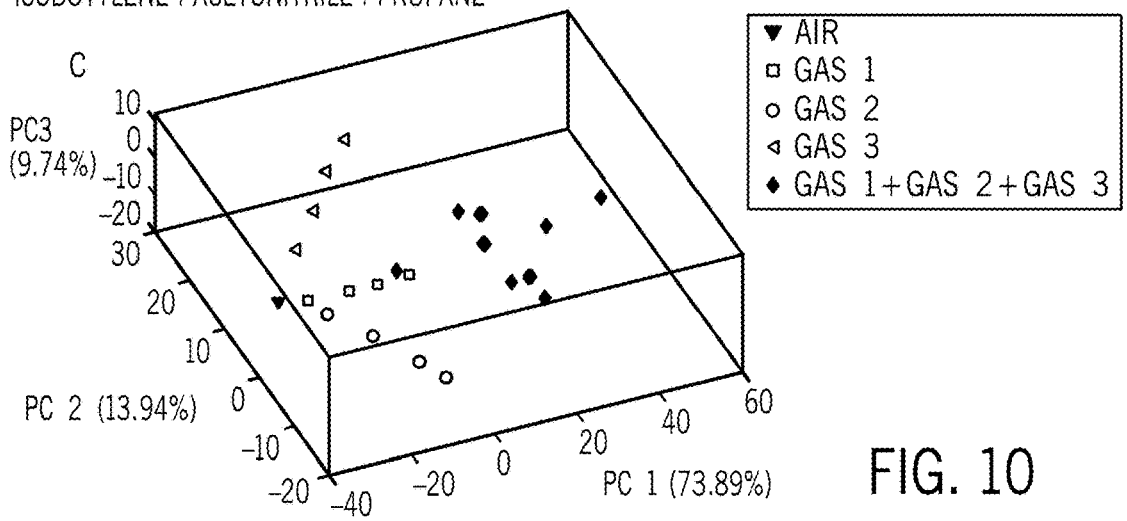
FIG. 10

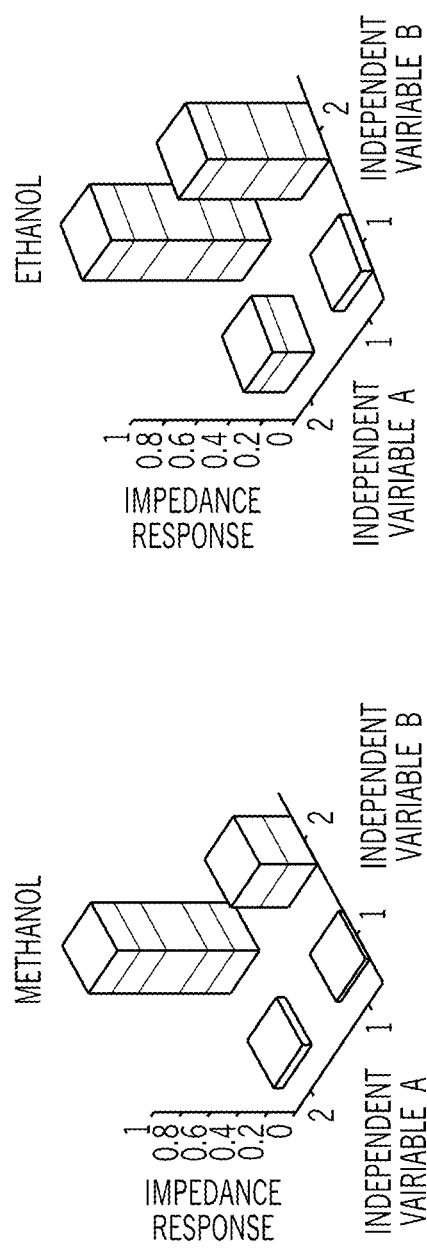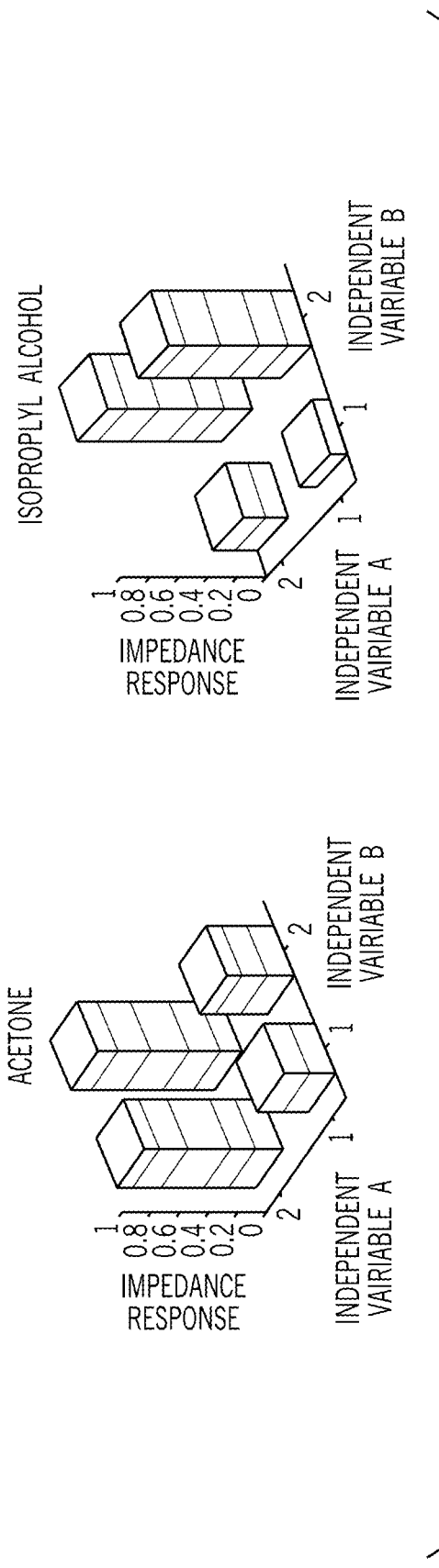
FIG. 14

EXAMPLE 7
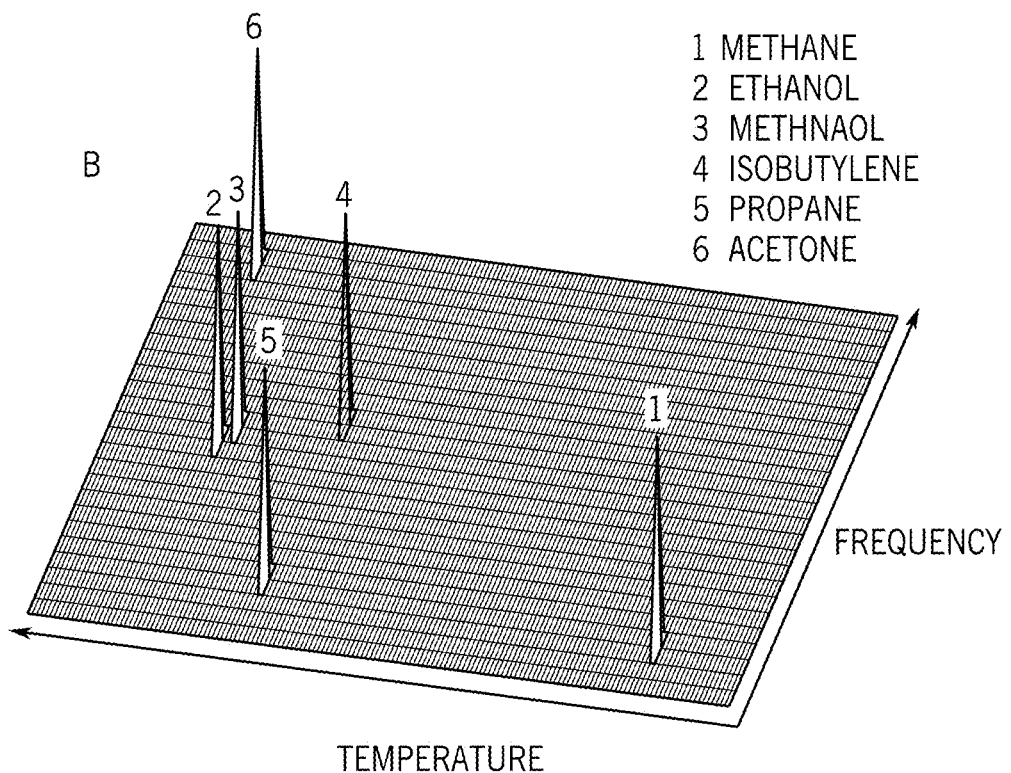
1 METHANE
2 ETHANOL
3 METHNAOL
4 ISOBUTYLENE
5 PROPANE
6 ACETONE
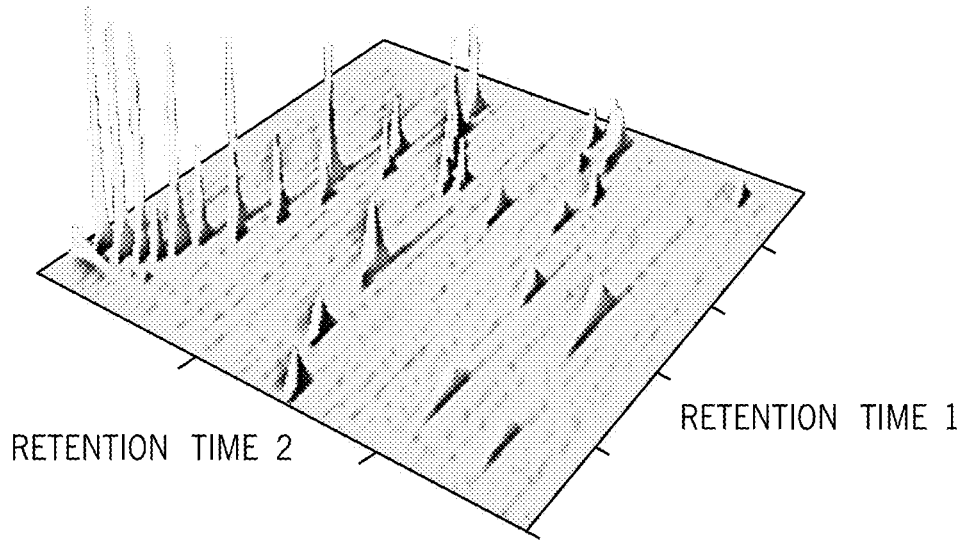
FIG. 15

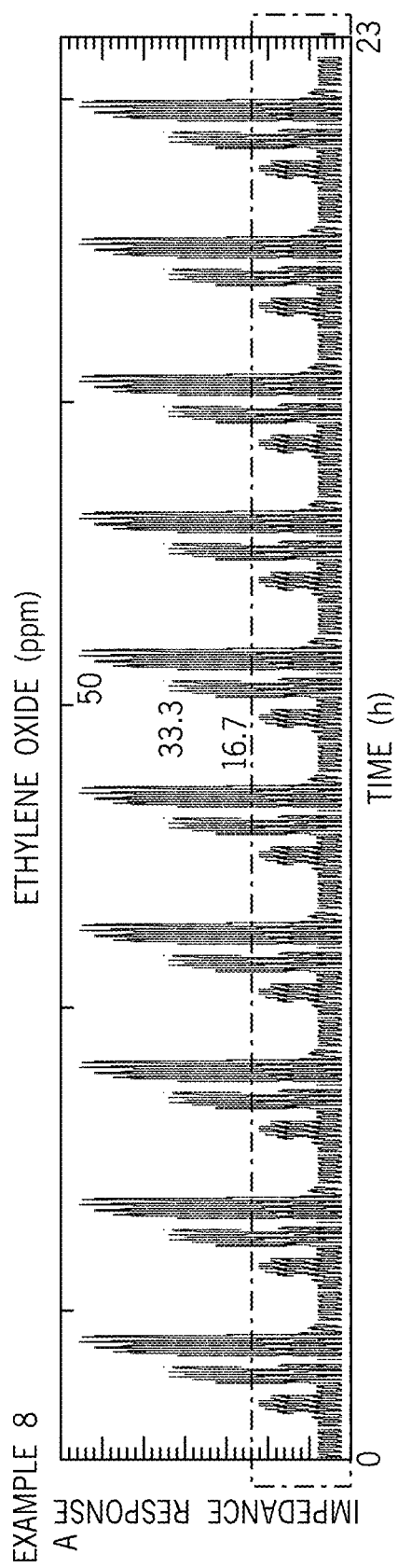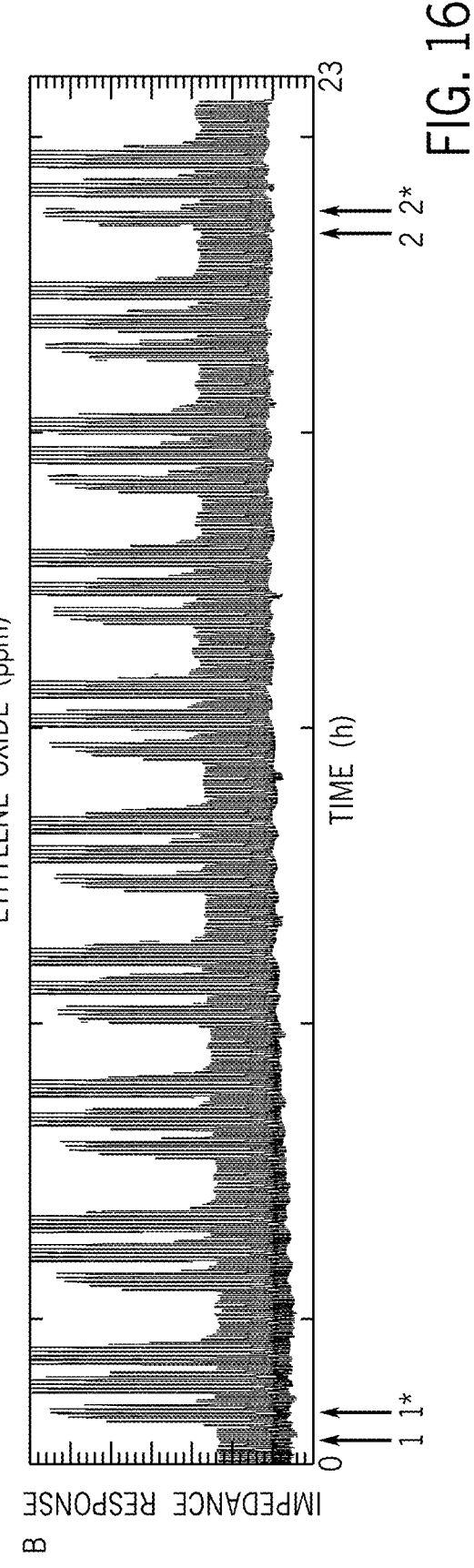
FIG. 16

EXAMPLE 8
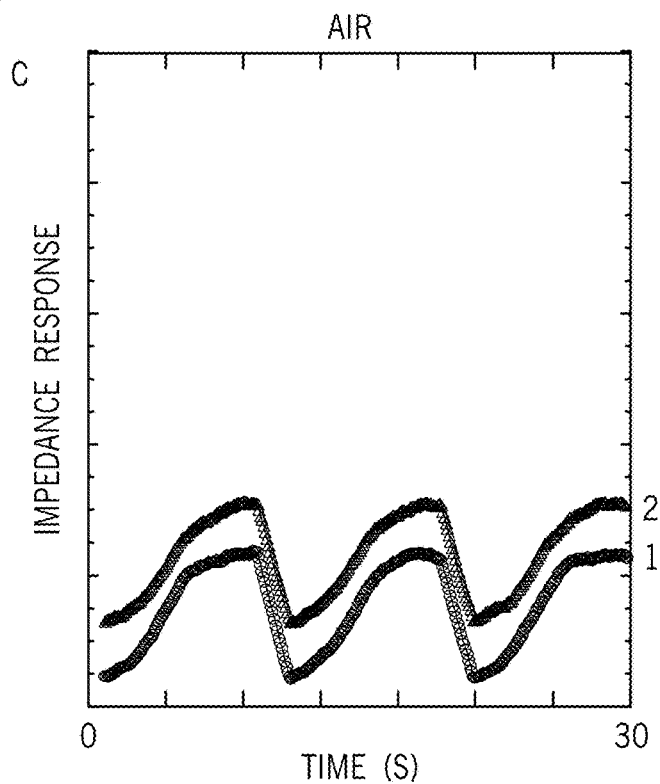
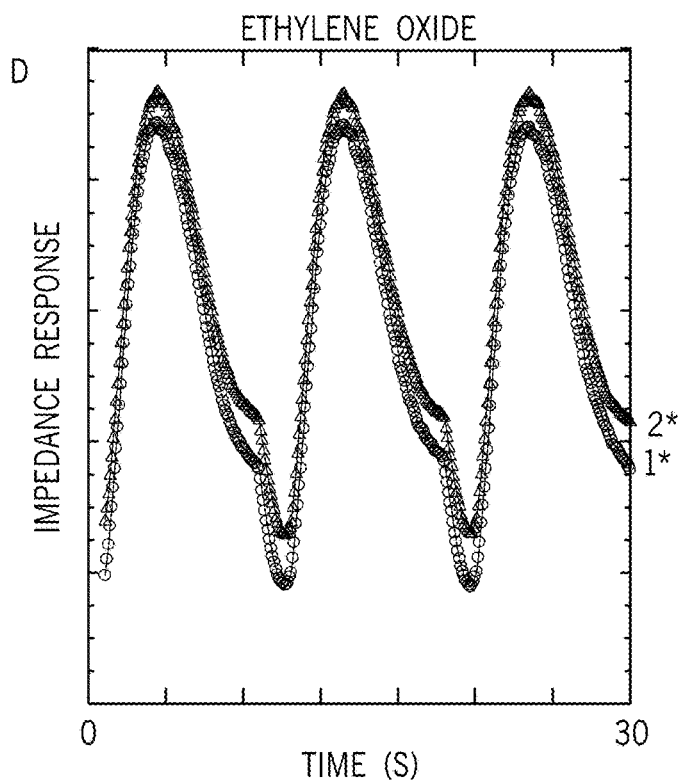
FIG. 16

SENSING SYSTEM AND METHOD

GOVERNMENT LICENSE RIGHTS

This invention was made with government support under DE-AR0001523 awarded by the Advanced Research Projects Agency-Energy (ARPA-E) of the United States Department of Energy. The government has certain rights in the invention.

FIELD

One or more embodiments are disclosed that relate to systems and methods for sensing gases.

BACKGROUND

Gas sensors may be based on sensing materials that include metal oxide semiconductor (MOS) materials, dielectric polymers, conducting polymers, nanotubes, metal organic frameworks, graphene, supramolecular compounds, and some others.

While conventional MOS sensors may have commercial success because of their broad applications for gas alarms in residential and industrial facilities, the readout (also known as the measurement) of MOS materials is conventionally performed by measuring resistance change of the material as a function of gas concentration. Such a relationship follows a well-known power law, with saturation of sensor response occurring at high concentrations.

It is conventionally expected that the performance of existing MOS and other gas sensors may degrade in the field compared to laboratory conditions because a sensor may lose its accuracy in the presence of chemical interferences such as multiple gases in measured air sample besides a gas of interest (analyte gas) and variations of ambient conditions over time may induce sensor-response fluctuations (i.e., drift).

BRIEF DESCRIPTION OF THE DRAWINGS

FIGS. 9-16 illustrate different examples of gas detection by the sensor of FIGS. 1-4, according to embodiments of the disclosed subject matter.

DETAILED DESCRIPTION

Figure 1:
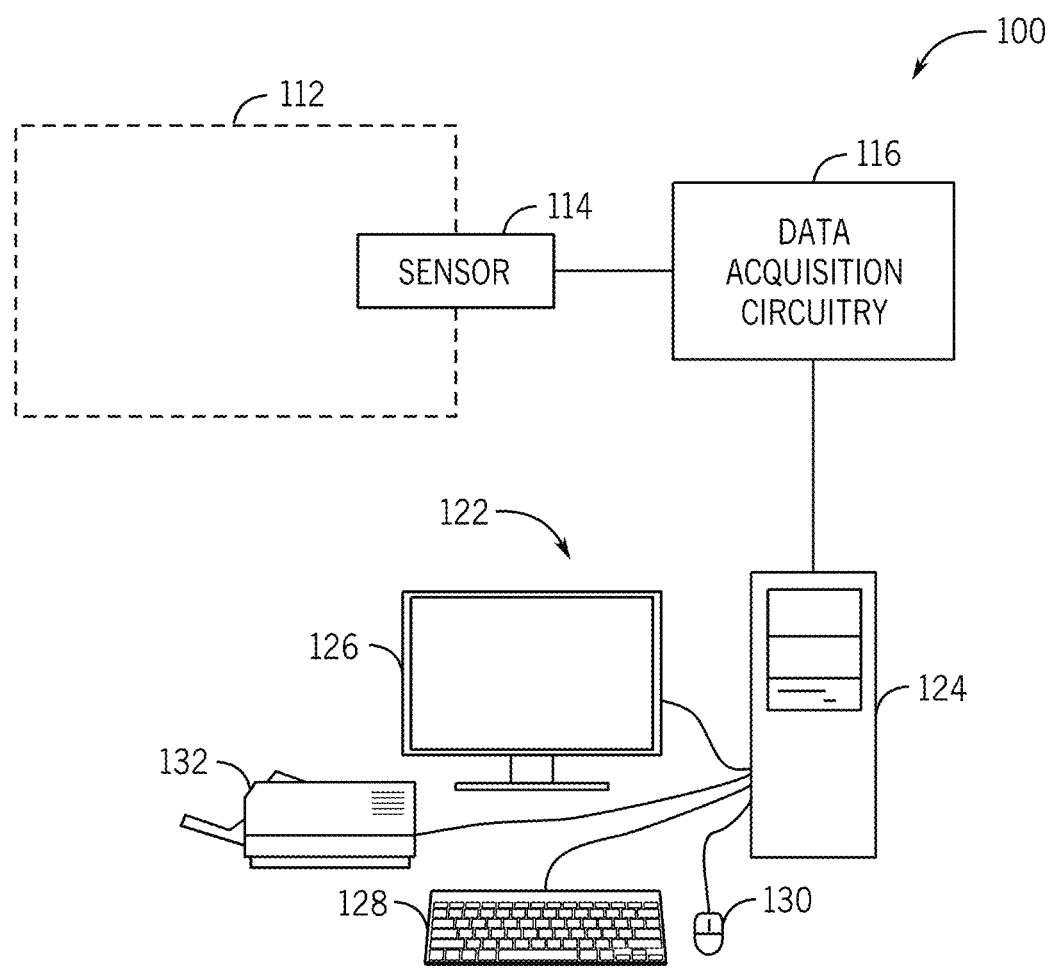
FIG. 1 illustrates one implementation of a sensor system, according to embodiments of the present disclosed subject matter.

The disclosed subject matter is related to baseline drift correction, sensitivity correction, classification of multiple individual gases, quantification (quantitation) of multiple individual gases, warm up time reduction, statistical decomposition of individual gases in their simple and complex mixtures, and simplification of calibration of MOS sensors. The non-linearity of MOS sensors with resistance readout is an inherent issue due to the power law that governs DC resistance response of MOS sensors. The power law in MOS sensors with resistance measurements (MOS chemiresistors) originates from the gas-induced changes in the electrical conduction and polarization effects along the percolating conduction paths of the MOS sensing material. The non-linear response reduces the sensitivity of MOS sensors at high gas concentrations when MOS sensor resistance is measured and makes additional sensor calibration necessary, which increases total calibration cost and total calibration time.

A sensor system may include a sensing element including a substrate, sensing electrodes supported by the substrate, sensing material over the sensing electrodes, and a multi-energy-delivering element. The multi-energy-delivering element may be coupled to the sensing material and may deliver different types of operational energy to the gas sensing material. The detector system may include excitation and detection circuitry coupled to the sensing electrodes and the multi-energy-delivering element, and a controller coupled to the excitation and detection circuitry. The controller may cause the excitation and detection circuitry to achieve multi-gas differentiation with one-, two-, or higher-dimensional detection by applying an alternating current through the sensing electrodes at one or more operational frequencies for excitation of the sensing material, and applying at least one type of operational energy to the gas sensing material via the multi-energy-delivering element, wherein at least one type of operational energy has at least two levels.

A method may include repeatedly applying, by a controller, at least two different operational voltages to a heater of a sensor system, continuously applying, by the controller, alternating current through sensing electrodes at one or more operational frequencies of the sensor system for excitation of sensing material of the sensor system, measuring gas responses of the sensing element, by the controller, under the excitation with the alternating current through sensing electrodes at one or more operational frequencies at the first operational voltage that is applied to the heater, measuring gas responses of the sensing element, by the controller, under the excitation with the alternating current through sensing electrodes at one or more operational frequencies at the second operational voltage that is applied to the heater, detecting gas, by the controller, based on repeatedly applying at least the two different operational voltages to the heater and continuously applying alternating current through the sensing electrodes at one or more operational frequencies for excitation of the sensing material, achieving differentiation, by the controller, between multiple analyte gases.

Continuously applying an alternating current through the sensing electrodes at one or more operational frequencies for excitation of the sensing material may be performed as an excitation or dielectric excitation of the sensing material at a shoulder of its dielectric relaxation region. Operational frequencies for excitation of the sensing material may also be known as operation frequencies, operating frequencies, or frequencies.

A level of voltage applied to a heater of a sensor system at a specific instant in time may be called an operational voltage, an operation voltage, an operating voltage, or a voltage.

A level of voltage applied to a heater of a sensor system at a specific instant in time may result in a desired temperature of the sensing material and the sensing element. This temperature of the sensing material and the sensing element may be called an operational temperature, an operation temperature, an operating temperature, or a temperature.

The multi-energy-delivering element may deliver different types of operational energies to the gas sensing material. The operational energy may be called an operation energy, an operating energy, or an energy. Types of an operational energy that may be delivered to the gas sensing material may involve thermal, radiant, and mechanical (or acoustic) types of energy.

In gas sensors, "sensitivity" is the "slope of the calibration curve", and hence a sensor ability to discriminate between small changes in gas concentration. A calibration curve is a relation between the concentrations of a gas (an independent X axis) and the gas sensor response (a Y axis). A linear gas sensor response as a function of gas concentrations is the linear correlation between original (raw) responses of the sensor and gas concentrations that this sensor is exposed to. "Linearity" of sensor response is a measure of how close the sensor response is to the linear fit between gas sensor readings (responses) and the actual gas concentrations.

Operation of a MOS sensor under its dielectric alternating current (AC) excitation may improve linearity of such MOS sensor response. Also, operation of a MOS sensor under its dielectric AC excitation may simplify sensor calibration. For a sensor to provide quantitative information about the concentrations of a measured gas in air, the sensor must be calibrated. Sensor calibration involves exposing the sensor to known concentrations of a gas in air (for example at part-per-billion (ppb) concentrations, or at part-per-million (ppm) concentrations, or at part-per-thousand (ppth) concentrations or combinations of thereof) at controlled environmental conditions such as controlled temperature of ambient air, controlled relative humidity of ambient air, controlled pressure of ambient air, and controlled levels of any other gases present in ambient air.

For sensor calibration, the original sensor readings (for example, Ohms of resistance) are recorded while the sensor is exposed to different known concentrations of the gas of interest in air, the numerical values of the recorded original sensor readings are correlated to the different known concentrations of the gas in air, and this correlation is expressed as a transfer function between the original readings of the sensor and the known concentrations of the gas in air. The resulting transfer function is a mathematical equation that relates the measured original readings of the sensor (for example, Ohms of resistance) to ppb or ppm or ppth concentrations. For a highly linear sensor response, a transfer function with a linear fit between original sensor readings and ppb or ppm or ppth concentrations of the gas may be appropriate. For a non-linear sensor response, a transfer function that adequately describes a non-linear fit between original sensor readings and ppb or ppm or ppth concentrations of the gas may be appropriate. Nonlimiting examples of such transfer functions with non-linear fit include a second-order polynomial fit, a third-order polynomial fit, a fourth-order polynomial fit, a power-law fit, an exponential fit, a logarithmic fit, and any other fits known in the art and/or combinations thereof of a non-linear sensor response.

To calibrate a sensor that has a substantially linear response over the concentration range of interest of a particular gas, a relatively small number of different gas concentrations of the gas is needed as compared to the need to calibrate a sensor that has a substantially non-linear response over the concentration range of interest of a particular gas. Illustrative numbers of different gas concentrations to calibrate a sensor with a substantially linear response over its calibration range may be two or three different gas concentrations. Illustrative numbers of different gas concentrations to calibrate a sensor with a slightly non-linear response may be three or four or five different gas concentrations. Illustrative numbers of different gas concentrations to calibrate a sensor with a substantially non-linear response may be five or more different gas concentrations.

Such additional gas-calibration points require an additional cost and time for calibration. Such additional cost and time of the calibration may be required for every controlled environmental condition such as every level of temperature of ambient air, every level of relative humidity of ambient air, every level of pressure of ambient air, and every level of any other gases present in ambient air.

FIG. 1 illustrates one embodiment of a sensor system 100 that may be used to examine a fluid in contact with the system 100. The fluid may be a gas, a liquid, a gas-liquid mixture, particles or particulate matter, or the like, containing one or more analyte gases. In some cases, the sensor system 100 (e.g., a fluid sensor) may continuously and/or in real-time measure concentration of one or more analyte gases to determine a change in the concentration of the one or more analyte gases. The sensor system 100 may convert such measurement into analytically useful signals for continuous monitoring of at least one component in a fluid such as one analyte gas. An analytically useful signal may be a raw measured sensor response, for example, sensor impedance at a given frequency, or a concentration of the gas determined by using a stored relation between measured sensor readings and known gas concentrations (i.e., a stored transfer function).

The fluid may include indoor or outdoor ambient air. Another example of the fluid is air at an industrial, residential, military, construction, urban, and any other known site. Another example of the fluid is ambient air with relatively various concentrations of hydrocarbons and/or other pollutants. For example, the fluid may include ambient air with relatively small concentrations of benzene, naphthalene, carbon monoxide, ozone, formaldehyde, nitrogen dioxide, sulfur dioxide, ammonia, hydrofluoric acid, hydrochloric acid, phosphine, ethylene oxide, carbon dioxide, hydrogen sulfide, chemical warfare agents such as nerve, blister, blood, and choking agents, hydrocarbons and/or other pollutants. Another example of the fluid is a disinfection agent, such as alcohol, aldehyde, chlorine dioxide, hydrogen peroxide. Another example of the fluid is ambient air with relatively small concentrations, medium concentrations, and large concentrations of flammable or combustible gases such as methane, ethane, propane, butane, hydrogen, and/or other gases.

In certain embodiments, the fluid may include analyte gases that are indoor pollutants. A non-limiting list of example indoor pollutants includes, but is not limited to: acetaldehyde, formaldehyde, 1,3-butadiene, benzene, chloroform, methylene chloride, 1,4-dichlorobenzene, perchloroethylene, trichloroethylene, naphthalene, and polycyclic aromatic compounds. In certain embodiments, the fluid may include analyte gases that are outdoor pollutants. A non-limiting list of example outdoor pollutants includes, but is not limited to: ozone, nitrogen dioxide, sulfur dioxide, and carbon monoxide.

Another example of the fluid is SF6 gas. Sulfur hexafluoride SF6 is an inorganic gas that is used in the electrical industry as a gaseous dielectric medium for high-voltage circuit breakers, switchgear, and other electrical gas insulated equipment (GIE). Another example of the fluid is a mixture of a heptafluoroisobutyronitrile gas, carbon dioxide gas, and oxygen gas. This mixture is known as a 'g3—green gas for grid' and is utilized as an insulating gas in high and medium voltage gas insulated equipment (GIE) such as circuit breakers, switches, and other types of gas insulated equipment. In practical operation conditions in GIE, the g3 gas mixtures may experience decomposition due to arcing, sparking, thermal effects, and any other known effects. Illustrative decomposition products may include trifluoroacetonitrile, carbonyl fluoride, octafluoropropane, perfluoroisobutane, tetrafluoromethane, and known other volatiles. These decomposition products may contain fluorinated groups in their molecules. Testing of volatile molecules with fluorinated groups may require health and safety approvals. Thus, chemical simulants may be also utilized for initial testing of sensors. Chemical simulants are compounds that mimic physicochemical properties of more toxic gases but with reduced or no toxicity. They are commonly utilized in different industrial, homeland security and other scenarios to develop relevant measurement capabilities, followed by the validation on real agents in special certified laboratories. Illustrative chemical simulants for decomposition products such as trifluoroacetonitrile, carbonyl fluoride, octafluoropropane, perfluoroisobutane, and tetrafluoromethane may be acetonitrile, acetone, propane, isobutylene, and methane, respectively.

Another example of the fluid is at least one gas dissolved in an industrial liquid such as transformer oil, bioprocess media, fermentation media, wastewater, and/or any other media, gas, or liquid. Another example of the fluid is the at least one gas dissolved in a consumer liquid such as milk, non-alcoholic beverages, alcoholic beverages, cosmetics, and any other. Another example of the fluid is the at least one gas dissolved in a consumer liquid such as milk, non-alcoholic beverages, alcoholic beverages, cosmetics, and any other.

Another example of the fluid is transformer oil or any insulating fluid of an electrical transformer that is installed and/or disposed below a ground level, above the ground level, near to the ground level, or at any other position. In another embodiment, the fluid may be a gas or fuel, such as a hydrocarbon-based fuel. One example of the fluid is natural gas that is supplied to a powered system (e.g., a vehicle, or a stationary generator set) for consumption. Other examples of such a fluid can include gasoline, diesel fuel, jet fuel or kerosene, bio-fuels, petrodiesel-biodiesel fuel blends, hydrogen gas, natural gas (liquid or compressed), and fuel oils. Another example of the fluid is a gas dissolved in blood of a mammal. Nonlimiting examples of gases that may be dissolved in blood of a mammal include oxygen, carbon dioxide, and nitrogen gases. Another example of the fluid is a gas generated in a gastrointestinal tract of a mammal. Such a gas or gases may be monitored with ingestible gas sensors. Nonlimiting examples of gases generated in a gastrointestinal tract of a mammal include hydrogen, methane, carbon dioxide, and hydrogen sulfide.

In certain embodiments, the fluid may include analyte gases that are toxic industrial materials or toxic industrial chemicals. A non-limiting list of example toxic industrial materials and chemicals includes, but is not limited to, ammonia, arsine, boron trichloride, boron trifluoride, carbon disulfide, chlorine, diborane, ethylene oxide, fluorine, formaldehyde, hydrogen bromide, hydrogen chloride, hydrogen cyanide, hydrogen fluoride, hydrogen sulfide, nitric acid (fuming), phosgene, phosphorus trichloride, sulfur dioxide, sulfuric acid, and tungsten hexafluoride. In certain embodiments, the fluid may include analyte gases that are toxic materials of the medium Hazard Index.

A non-limiting list of example toxic materials of the medium Hazard Index includes, but is not limited to: acetone cyanohydrin, acrolein, acrylonitrile, allyl alcohol, allylamine, allyl chlorocarbonate, boron tribromide, carbon monoxide, carbonyl sulfide, chloroacetone, chloroacetonitrile, chlorosulfonic acid, diketene, 1,2-dimethylhydrazine, ethylene dibromide, hydrogen selenide, methanesulfonyl chloride, methyl bromide, methyl chloroformate, methyl chlorosilane, methyl hydrazine, methyl isocyanate, methyl mercaptan, nitrogen dioxide, phosphine, phosphorus oxychloride, phosphorus pentafluoride, selenium hexafluoride, silicon tetrafluoride, stibine, sulfur trioxide, sulfuryl chloride, sulfuryl fluoride, tellurium hexafluoride, n-octyl mercaptan, titanium tetrachloride, trichloroacetyl chloride, and trifluoroacetyl chloride.

In certain embodiments, the fluid may include analyte gases that are toxic materials of the low Hazard Index. A non-limiting list of example toxic materials of the low Hazard Index includes, but is not limited to: allyl isothiocyanate, arsenic trichloride, bromine, bromine chloride, bromine pentafluoride, bromine trifluoride, carbonyl fluoride, chlorine pentafluoride, chlorine trifluoride, chloroacetaldehyde, chloroacetyl chloride, crotonaldehyde, cyanogen chloride, dimethyl sulfate, diphenylmethane-4,40-diisocyanate, ethyl chloroformate, ethyl chlorothioformate, ethyl phosphonothioic dichloride, ethyl phosphonic dichloride, ethyleneimine, hexachlorocyclopentadiene, hydrogen iodide, iron pentacarbonyl, isobutyl chloroformate, isopropyl chloroformate, isopropyl isocyanate, n-butyl chloroformate, n-butyl isocyanate, nitric oxide, n-propyl chloroformate, parathion, perchloromethyl mercaptan, sec-butyl chloroformate, tert-butyl isocyanate, tetraethyl lead, tetraethyl pyrophosphate, tetramethyl lead, toluene 2,4-diisocyanate, and toluene 2,6-diisocyanate.

The system 100 may include a fluid reservoir 112 for holding the fluid and one gas sensor 114 (e.g., a multivariable gas sensor 114) at least partially disposed on or within the fluid reservoir 112. Alternatively, the sensor 114 may be set in a flow path of the fluid outside of the reservoir 112, such as coupled to in-line connectors in fluid communication with the fluid reservoir 112 that define a flow path. In any case, the sensor 114 may monitor concentration of one or more components of one or more analyte gases continuously, based on an interval, or upon receiving control signals indicative of gas concentration measurement.

The gas sensor 114 (e.g., the multivariable gas sensor 114) may provide two or more outputs that are substantially independent of each other. The fluid reservoir 112 may be in a form of a vessel with controlled volume or in a form of an open area such as an indoor facility (e.g., a room, a hall, a house, a school, a hospital, a confined space, or the like), or in the form of an outdoor facility (e.g., a stadium, a gasproduction site, a seashore, a forest, or the like). In one embodiment, the sensor 114 may provide continuous monitoring of the fluid within the reservoir or flow path. In one or more embodiments, the sensor 114 may be an impedance gas sensor, an electromagnetic sensor, a photonic sensor, an electronic sensor, a hybrid sensor, or another type of sensor. Optionally, the gas sensor 114 may include a sensor array.

The sensor 114 may detect characteristics or properties of the fluid via a resonant or non-resonant impedance spectral response. One or more inductor-capacitor-resistor resonant circuits (LCR resonators) may measure the resonant impedance spectral response of the sensor. A non-resonant impedance spectral response is measured when the resistor-capacitor (RC) circuit does not contain an inductor (L). The resonant or non-resonant impedance spectrum of the sensor 114 in operational contact with the fluid varies based on sample composition and/or components and/or temperature. The measured resonant or non-resonant impedance values Z' (which may be the real part of impedance, Zre) and Z" (which may be the imaginary part of impedance, Zim) reflect the response of the sensor 114 to the fluid.

The operational contact of a sensor with a fluid may be achieved by direct immersion of the sensor into fluid when the sensing material is in contact with the fluid or through a gas permeable membrane that may allow gases in fluid to diffuse through the membrane to the sensing material.

Other embodiments of the subject matter described herein include other designs of sensors besides resonant and non-resonant impedance sensors. Other sensors (e.g., multivariable sensors) can be electro-mechanical resonator sensors (e.g., tuning forks, cantilever sensors, acoustic wave device sensors), thermal sensors, optical sensors, acoustic sensors, photoacoustic sensors, near-infrared sensors, ultraviolet sensors, infrared sensors, visible light sensors, fiber-optic sensors, reflection sensors, or any multivariable sensors. The sensor may generate electrical, electromagnetic, or optical stimuli to measure a concentration of an analyte gas in ambient air at an industrial, residential, military, construction, urban, and any other known site or measure a concentration of an analyte gas in a transformer oil or in an insulating gas in high and medium voltage gas insulated equipment.

A stimulus signal (e.g., an electrical or magnetic field) may be applied to a sensing material or sensing film of the sensor 114 via electrodes. The distance between the electrodes and the electrodes' geometry as well as the applied periodic voltage to the electrodes, may define the magnitude of the stimulus signal applied to the sensor 114 (e.g., to the sensing material or film). The electrodes may be in direct contact with the sensing material. For example, the sensor 114 may be a combination of a sensing region and associated circuits and/or the sensing region may be coated with the sensing material. The sensing material may be semiconductor material or metal oxide material.

The sensor 114 may provide the electrical and/or electromagnetic stimulus signals to measure the impedance values of the sensing material (e.g., semiconductor material). In some cases, the sensor 114 may measure and store the impedance values of the sensing material in response to the stimulus signals. For example, the sensing material of the sensor 114 may have different impedance values based on different excitation frequencies of the stimulus signals, different temperatures of the sensing material, or both. Accordingly, in some cases, the sensor 114 may measure and store different impedance values for a concentration of an analyte gas based on different excitation frequencies of the stimulus signals, different temperatures of the sensing material, or both. Besides variation of temperatures, other types of operational energy that can be applied can involve radiant and mechanical (or acoustic) types of energy.

In some embodiments, excitation or dielectric excitation of the sensor 114 (e.g., a metal oxide semiconductor (MOS) sensing material) refers to an alternating current (AC) excitation of the sensor 114 (e.g., the MOS sensing material) at a shoulder of its dielectric relaxation region. As such, the stimulus signals may have an operational frequency for excitation of the sensing material higher than a direct current (DC) measurement at zero operational frequency. Moreover, in different embodiments, the sensor 114, the data acquisition circuitry 116, and/or a controller 122 (e.g., a workstation) may generate the stimulus signals. A controller 122 can also be on the same board as the sensor.

It should be appreciated that the impedance of the sensor 114 may be a non-limiting term for any electrical response of the sensing system to an AC current applied to the gas sensing material of the sensor 114. For example, the sensor 114 may determine and/or store the impedance spectrum based on storing the impedance values measured when applying the stimulus signals with different excitation frequencies and/or based on different temperatures of the sensing material. As such, the impedance spectrum may include impedance values of the sensing material of the sensor 114 that are measured in response to providing the stimulus signals having different excitation frequencies (e.g., a frequency sweep), when the sensing material have different temperatures over a range of temperatures (e.g., a temperature sweep).

Suitable sensors may include single use or multi-use sensors. A suitable multi-use sensor may be a re-usable sensor that may be used during the lifetime of a system in which it is incorporated. In one embodiment, the sensor may be a single use sensor that may be used during all or part of a monitored reaction or process.

Data from the sensor 114 may be acquired via data acquisition circuitry 116, which may be associated with the sensor or which may be associated with a control system, such as the controller 122. For example, the controller 122 may include data processing circuitry to perform additional processing and analysis. The controller 122 may include one or more wireless or wired components, and may also communicate with the other components of the system 100. Suitable communication models include wireless or wired communications. When the controller 122 is on the same board as the sensor, the resulting sensor system is known as edge-based sensor system.

The data acquisition circuitry 116 optionally can be disposed partially or entirely within the sensor 114. Other suitable locations may include disposition being partially or entirely within the controller 122. Further, the controller 122 can be replaced with a control system of the whole process where the sensor and its data acquisition circuitry may be connected to the control system of the process.

Depending on the design of a sensing material, interrogation of this sensing material (i.e., measurement of the gas-response of this sensing material) may be performed over an appropriate range of frequencies and/or temperatures. For example, a sensing material may be a MOS sensing material or a polymeric sensing material where the interrogation of a sensing material may be performed in the radio-frequency or microwave regions of the electromagnetic spectrum. In another example, a sensing material may be a photonic nanostructured iridescent sensing material or a plasmonic nanoparticles sensing material where the interrogation of a sensing material may be performed in the optical region of the electromagnetic spectrum.

The data acquisition circuitry 116 may be in the form of a sensor reader, which may be configured to communicate wirelessly or wired with the sensor 114 and/or the controller 122. For example, the sensor reader may be a battery-operated device and/or may be powered using energy available from the main control system.

Additionally, the data acquisition circuitry 116 may receive data from one or multiple sensors 114. For example, the multiple sensors 114 may be positioned at different locations in or around the fluid reservoir 112 and/or one or more other fluid reservoirs. The data may be stored in short term and/or long term memory storage devices, such as archiving communication systems, which may be located within or remote from the system and/or reconstructed and displayed for an operator, such as at the operator workstation. The sensors 114 may be positioned on or in fluid reservoirs, associated piping components, connectors, flow-through components, on or in gas-insulated equipment, and any other relevant process and/or wearable components.

The data acquisition circuitry 116 may include one or more processors for analyzing the data received from the sensor 114. For example, the one or more processors may be one or more computer processors, controllers (e.g., microcontrollers), or other logic-based devices that perform operations based on one or more sets of instructions (e.g., software). Moreover, the instructions on which the one or more processors operate may be stored on a tangible and non-transitory computer readable storage medium, such as a memory device. The memory device may include a hard drive, a flash drive, RAM, ROM, EEPROM, and/or the like. Alternatively, one or more of the sets of instructions that direct operations of the one or more processors may be hard-wired into the logic of the one or more processors, such as by being hard-wired logic formed and/or stored in the hardware of the one or more processors.

The controller 122 may control the above-described operations and functions of the system 100. In some embodiments, the controller 122 may display the received data. In specific cases, the controller 122 may receive operator instructions controlling one or more of the above-described operations and functions of the system 100. For example, the operator may provide the operator instructions based on the displayed data.

The controller 122 (e.g., edge-based sensor system or operator work station) may include one or more processor-based components, such as general purpose or application-specific computers or processors 124. In addition to the processor-based components, the computer may include various memory and/or storage components including magnetic and optical mass storage devices, internal memory, such as RAM chips, and so forth. The memory and/or storage components may be used for storing programs and routines for performing the techniques described herein that may be executed by the controller 122 or by associated components of the system 100.

Alternatively, the programs and routines may be stored on a computer accessible storage and/or memory remote from the controller 122 but accessible by network and/or communication interfaces present on the computer 124. The computer 124 may also comprise various input/output (I/O) interfaces, as well as various network or communication interfaces. The various I/O interfaces may allow communication with user interface devices, such as a display 126, keyboard 128, electronic mouse 130, and printer 132, that may be used for viewing and inputting configuration information and/or for operating the sensor system 100. Other devices, not shown, may be useful for interfacing, such as touchpads, heads up displays, microphones, and the like. The various network and communication interfaces may allow connection to both local and wide area intranets and storage networks as well as the Internet. The various I/O and communication interfaces may utilize wires, lines, or suitable wireless interfaces, as appropriate or desired.

In one or more embodiments, the sensor system 100 may be a handheld sensor system. In one or more embodiments, the sensor system 100 may be a wearable sensor system, may be held within a wearable and/or non-wearable transferrable object (e.g., a frame of military or industrial eyeglasses), or the like. The wearable device may be worn by a subject, such as a human or animal, may be removably coupled or integrated with an article worn by a subject (e.g., a shirt, pants, safety vest, safety personal protection clothing, eyeglasses, hat, helmet, hearing device, or the like), or may be any alternative device that may be transferrable such that sensor can be moved between different positions, may be stationary or substantially stationary, or the like.

Figure 2:
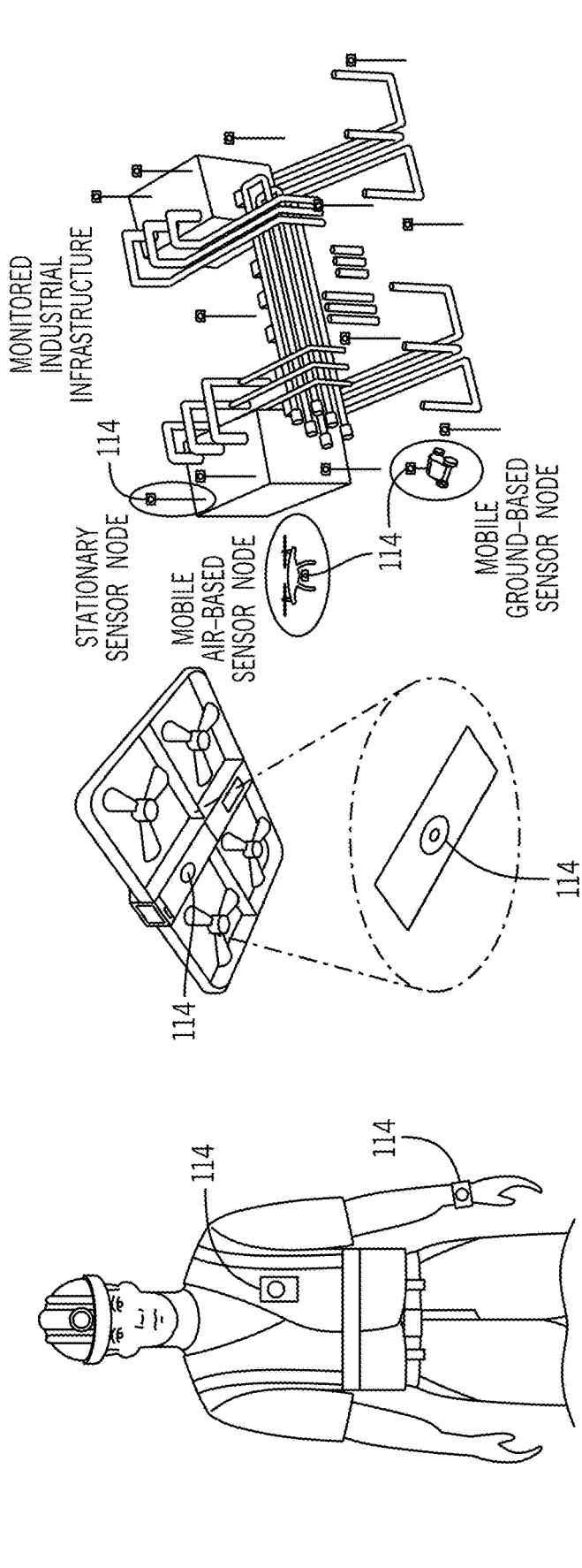
FIG. 2 illustrates exemplary positions of a gas sensor system as a wearable gas sensor system, as mounted on an unmanned vehicle, or as mounted on a voltage gas insulated equipment, according to embodiments of the present disclosed subject matter.

In one or more embodiments, the sensor 114 may be a wearable device worn by a subject, such as a human or an animal, or mounted on an unmanned vehicle as illustrated by FIG. 2. Specifically, FIG. 2 illustrates non-limiting examples of positions of the gas sensing system for detection of a combustible gas or any other gas or vapor of interest using a single sensor 114 with a broad dynamic range. FIG. 2 demonstrates various positions a wearable sensor 114 may be worn. For example, the wearable sensor 114 may be worn directly on the body of a subject. Alternatively, the wearable sensor 114 may be removably coupled or integrated with an article worn by a subject. For example, as illustrated in FIG. 2, the wearable sensor 114 may be worn on military or industrial headgear, on a shirt sleeve, or on the front of a shirt or jacket or vest. Additionally, the wearable sensor 114 may be worn on the hand or wrist, either directly on the body or integrated on a glove, as depicted in FIG. 2. Alternatively, the wearable sensor 114 may be an ingestible sensor.

Alternatively, the wearable sensor 114 may be removably coupled or integrated with a non-wearable transferrable object, such as an unmanned vehicle, for example on an unmanned ground or aerial or other vehicle. In this way, the wearable sensor 114 may be coupled or integrated with any alternative object or device that may be transferrable such that the sensor 114 can be moved between different positions, may be stationary or substantially stationary, or the like. Although not shown in FIG. 2, the wearable sensor may also be removably coupled or integrated with eyeglasses, pants, a safety vest, safety personal protection clothing, a hat, a hearing device, or any other wearable device or article of clothing. In the illustrated embodiment of FIG. 2, the subject is a human subject, however the subject may be a mammal subject, a plant subject, a robot subject, or the like. FIG. 2 also illustrates example positions of sensor systems to monitor an industrial infrastructure such as voltage gas insulated equipment using stationary sensor nodes, mobile air-based sensor nodes, and mobile ground-based sensor nodes, according to embodiments of the present disclosed subject matter.

Figure 3:
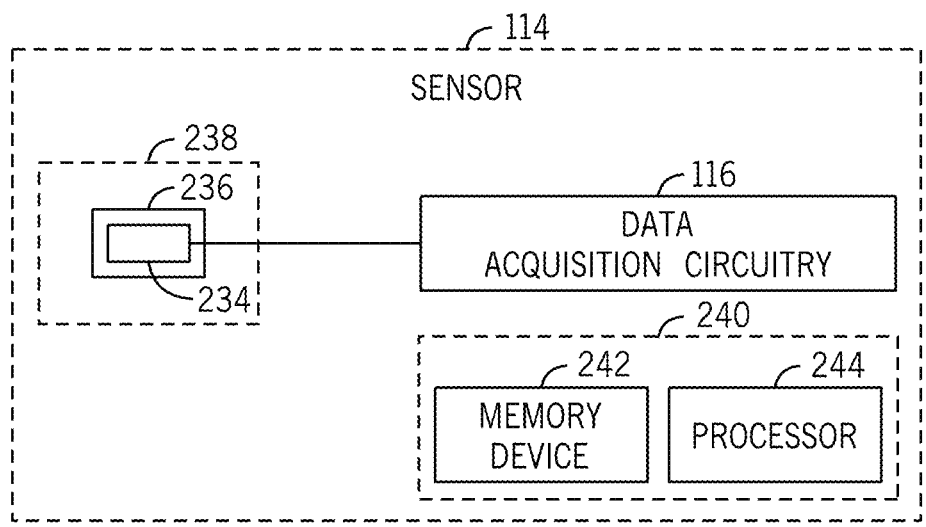
FIG. 3 illustrates a non-limiting example of a design of a sensor shown in FIG. 1, according to embodiments of the present disclosed subject matter.

FIG. 3 illustrates a non-limiting example of a design of the sensor 114. A sensing electrode structure 234 of the sensor 114 may be connected to the data acquisition circuitry 116. The sensing electrode structure 234 may be coated with a sensing material 236 (or a sensing film). The sensing electrode structure 234 and the sensing material 236 may form a sensing element 238. The sensing element 238, including the sensing electrode structure 234 and the sensing material 236, may contact a fluid during an operation of the sensor 114. The fluid may include the one or more analyte gases. Suitable interdigital electrode structures for probing a fluid sample may include two- and four-electrode structures. Suitable materials for electrodes include stainless steel, platinum, gold, noble metals, and others. Suitable materials of a substrate may include silicon dioxide, silicon nitride, alumina, ceramics, and others. Suitable examples of sensing materials 236 include a metal oxide material, a metal oxide semiconducting or semiconductor material, a composite material, semiconducting materials, n-type semiconducting materials, p-type semiconducting materials, n-/n-type heterostructured semiconducting materials, n-/p-type heterostructured semiconducting materials, p-/p-type heterostructured semiconducting materials, semiconducting materials with heterojunctions, nanocomposite materials, inorganic materials, organic materials, polymeric materials, formulated materials, any known sensing material, or the like. Heterostructured metal oxide semiconductor materials may also be known as heterostructural metal oxide semiconductor materials.

Suitable electrodes may be formed using metal etching, screen-printing, ink-jet-printing, and mask-based metal deposition techniques. The thickness of fabricated electrodes on the substrates may be in the range from about 10 nanometers to about 1,000 micrometers. The materials for the interdigital electrode structures, substrate, sensing layer, and electrode formation methods may be selected based at least in part on the application specific parameters.

In the depicted embodiment, the sensor 114 may include a selector 240 including a memory device 242 and a processor 244. In some embodiments, the memory device 242 may store excitation parameters for providing stimulus signals to the sensing electrode structure 234 and/or the sensing material 236. The processor 244 may reference the memory device 242 to determine the excitation parameters for providing the stimulus signals to the sensing element 238. In some embodiments, the processor 244 may perform a frequency sweep, a temperature sweep, or both to determine and store the excitation parameters on the memory device 242. Alternatively or additionally, the excitation parameters may be predetermined and stored on the memory device 242.

The excitation parameters may include one or multiple excitation frequencies for providing the stimulus signals to the sensing element 238. For example, each excitation frequency of the excitation parameters may correspond to a single excitation frequency or a range of excitation frequencies. As such, the processor 244 may generate the stimulus signals with a single excitation frequency or multiple excitation frequencies based on retrieving the excitation parameters.

The excitation parameters may include multiple sets of temperatures associated with one or more of the excitation frequencies. For example, the processor 244 may direct heating (e.g., may successively heat) the sensing element 238 to the temperatures of a first set of temperatures associated with a first excitation frequency when outputting the stimulus signals with the first excitation frequency. Each temperature of the first set of temperatures may correspond to a single temperature or a range of temperatures of the sensing element 238 for receiving the stimulus signals with the first excitation frequency. In some embodiments, the excitation parameters may include multiple temperature sets associated with multiple excitation frequencies, such as repeatedly applying at least two different voltages to the heater (also known as time-modulated heater voltage), and applying an alternating current through the sensing electrodes at one or more operational frequencies for excitation of the sensing material.

In some cases, the excitation parameters may include time durations for switching between the temperatures of a temperature set. For example, the processor 244 may switch away to heating the sensing element 238 to a subsequent temperature of the first set of temperatures based on one or more first time durations when outputting the stimulus signals with the one or more operational excitation frequencies.

Similarly, in some embodiments, the processor 244 may switch away to heating the sensing element 238 to a subsequent temperature of a second set of temperatures associated with one or more operational excitation frequencies. The one or more operational excitation frequencies are the same under operation at different temperatures. That is, the sensing element 238 may switch to having different temperatures of a respective set of temperatures based on a respective time duration when receiving the stimulus signals with one or more operational excitation frequencies at a given temperature.

In some embodiments, the processor 244 may generate control signals based on the excitation parameters. The processor 244 may output the control signals to an excitation circuit of the sensor 114 to generate and output the stimulus signals with the different excitation frequencies to the sensing element 238. Moreover, the processor 244 may output the control signals to a heating element (e.g., energy-delivering element) of the sensor 114 to heat the sensing element 238 based on the different temperatures and time durations associated with each temperature. In some embodiments, the processor 244 may generate the stimulus signals or the control signals to perform a frequency sweep, a temperature sweep, or both.

The processor 244, the excitation circuit, or both may apply the stimulus signals to the sensing element 238 (e.g., the sensing electrode structure 234, the sensing material 236, or both). The sensing element 238 may output response signals based on receiving the stimulus signals. The sensing element 238 may provide each response signal based on the excitation frequency of a respective stimulus signal, the temperature of the sensing element 238 when receiving the respective stimulus signal, and exposure to and/or a concentration of one or more analyte gases in operational contact with the sensing element 238. A sensitivity of the sensing element 238 to different concentrations of different analyte gases may vary based on receiving a stimulus signal with different excitation frequencies and a temperature of the sensing element 238 when receiving the stimulus signal.

With the foregoing in mind, an impedance analyzer of the sensor 114 may receive the response signals. If not compensated for, in some cases, the response signals may exhibit a baseline drift (e.g., a baseline response drift, baseline impedance response drift) based on environmental or electrical sources and/or various other variables such as ambient conditions at the sensor 114. The processor 244, the impedance analyzer, or both may analyze the response signals at multiple temperatures and frequencies to reduce the baseline drift. In some embodiments, the processor 244, the impedance analyzer, or both may analyze the response signals of the stimulus signals having a single excitation frequency at multiple temperatures associated with the excitation frequency to reduce the baseline drift. In alternative or additional embodiments, the processor 244, the impedance analyzer, or both may analyze the response signals of the stimulus signals having multiple different excitation frequencies at multiple respective temperatures associated with each respective excitation frequency to reduce the baseline drift.

For example, the processor 244, the impedance analyzer, or both may receive response signals associated with stimulus signals having a first operational excitation frequency at a first temperature and at least at a second temperature of the sensing element 238. The response signals measured at the first temperature of the sensing element 238 may correspond to gas responses of the sensing element 238 and/or the sensor 114 to an analyte gas. That is, the sensing element 238 may generate the gas responses based on receiving the stimulus signals with the first operational excitation frequency when operating at the first temperature. The gas responses may be indicative of a concentration of the analyte gas in operational contact with the sensing element 238. In some cases, if not compensated for, the gas responses may exhibit the baseline drift.

The response signals measured at the second temperature of the sensing element 238 may correspond to baseline responses of the sensing element 238 and/or the sensor 114. That is, the sensing element 238 may generate the baseline responses based on receiving the stimulus signals with the first operational excitation frequency when operating at the second temperature. A sensor baseline response may correspond to the sensor response when an analyte gas is undetectable, i.e., when the sensor response in the presence of the analyte gas has a similar magnitude as the sensor response in the absence of the analyte gas.

In some embodiments, the processor 244 may perform a temperature sweep across the first operational excitation frequency to determine and store the second temperature indicative of the baseline responses of the sensing element 238 and/or the sensor 114 at the first operational excitation frequency. In alternative or additional embodiments, the second temperature being indicative of the baseline responses of the sensing element 238 and/or the sensor 114 at the first operational excitation frequency is predetermined and stored in the memory device 242. In any case, the processor 244, the impedance analyzer, or both may subtract the gas responses and the baseline responses to compensate (e.g., correct) for the baseline drift, as will be appreciated. Accordingly, in some cases, the processor 244, the impedance analyzer, or both may improve an accuracy of the gas responses based on reducing the baseline drift. It should be appreciated that the processor 244, the impedance analyzer, or both may similarly improve accuracy of the gas responses at a second excitation frequency, a third excitation frequency, and so on.

In some embodiments, the processor 244 may include such an impedance analyzer. Alternatively or additionally, the impedance analyzer may be implemented separately from the processor 244 and may provide analyzed response signals or an indication of the baseline drift or noise of the response signals to the processor 244. Some embodiments associated with the impedance analyzer and the excitation circuit are described in more details below. Moreover, it should be appreciated that although the selector 240, including the memory device 242 and the processor 244, is shown as part of the sensor 114, in different embodiments the controller 122 (shown in FIG. 1) may include the memory device 242 and/or the processor 244. Alternatively or additionally, the memory device 242, the processor 244, or both may be implemented as standalone components.

Figure 4:
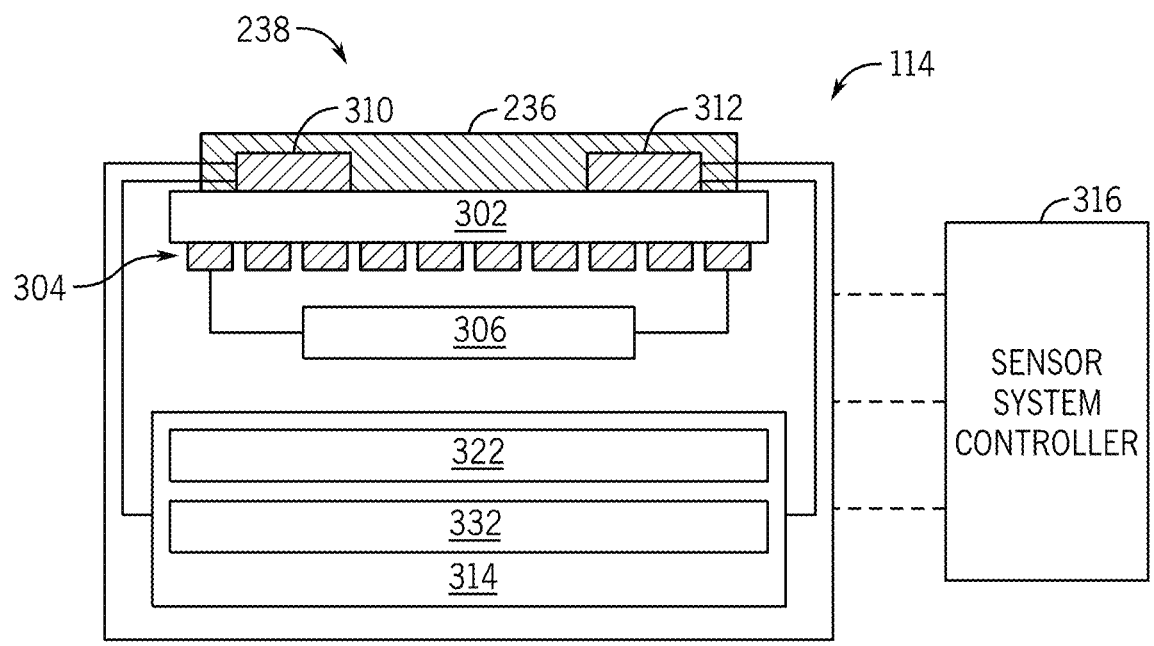
FIG. 4 illustrates one implementation of the sensor of FIGS. 1-3, according to embodiments of the present disclosed subject matter.

FIG. 4 illustrates one embodiment of the gas sensor 114. The sensor 114 includes a sensing element 238 having a substrate 302, such as a dielectric material, the sensing film or sensing material 236 that is coupled to the substrate 302, and electrodes 310 and 312. The sensing material 236 may be exposed to, in contact with, in indirect contact with, or the like, at least one analyte gas. The sensor 114 may include at least one heating element 304, such as a resistance body, coupled to a different or same sides of the substrate 302 relative to the sensing material 236.

At least one heating element 304 may receive electric voltage and current from a heater controller 306, which represents hardware circuitry that applies the current or/and voltage to the at least one heating element 304 to heat the substrate 302 and/or the sensing material 236. A sensor system controller 316 (e.g., a controller) may generate and output control signals to the heater controller 306 or to the at least one heating element 304. The control signals may provide instructions to heat the sensing element 238 based on multiple temperatures (e.g., a temperature set) and respective time durations associated with an excitation frequency of the stimulus signals. For example, the sensor system controller 316 may reference a memory device, such as the memory device 242 discussed above with respect to FIG. 3, to determine the one or multiple temperature sets and respective time durations associated with one or multiple respective excitation frequencies of the stimulus signals.

In one or more embodiments of the subject matter described herein, the sensing material 236 may include MOS material. The sensing material 236 can include one or more materials deposited onto the substrate 302 to perform a function of predictably and reproducibly affecting the impedance sensor response upon interaction with the environment. For example, a metal oxide semiconductor material, such as $SnO_2$, may be deposited as the sensing material 236. Other nonlimiting examples of MOS materials include single-metal oxides (e.g., ZnO, CuO, CoO, SnO2, TiO2, ZrO2, CeO2, WO3, MoO3, In2O3), perovskite oxides structures with two differently sized cations (e.g., SrTiO3, CaTiO3, BaTiO3, LaFeO3, LaCoO3, SmFeO3, BiFeO3), heterojunction metal oxide materials (In2O3/Sn2O3, In2O3/ZnO, NiO/ZnO, LaFeO3/TiO2, Pt—SnO2/ZnO, ZnO/SnO2, NiO—CuO), and mixed metal oxide compositions (e.g., CuO—BaTiO3, ZnO—WO3, SnO2—TiO2, NiO—CuO, ZnO—NiO—CuO), n-/n-type heterostructured semiconducting metal oxide materials, n-/p-type heterostructured semiconducting metal oxide materials, p-/p-type heterostructured semiconducting metal oxide materials, semiconducting materials with heterojunctions. MOS materials may be formed as 0-D, 1-D, 2-D, or 3-D nanostructures, or MOS materials may be formed as nanoparticles, nanowires, nanotubes, nanobelts, nanosheets, or nanocubes.

The sensing electrodes 310 and 312 are coupled with and/or disposed on or in the sensing material 236 and are connected with the substrate 302 in the illustrated embodiment. The sensing electrodes 310 and 312 are conductive bodies that are conductively coupled to an excitation/detection circuit 314. The excitation/detection circuit 314 may include an excitation circuit 322 including a source of an alternating current that outputs an alternating current at one or more operational frequencies and an impedance analyzer 332. Alternatively or additionally, the excitation/detection circuit 314 may include the impedance analyzer 332 including the source of an alternating current and the detector system.

The impedance analyzer 332 may include a detector system and/or may include circuitry to convey received signals from the sensing electrodes 310 and 312 to the sensor system controller 316 for processing. In any case, in the illustrated embodiment, the sensing electrodes 310 and 312 may be directly and independently coupled to the excitation/detection circuit 314.

In some cases, the excitation circuit 322 and/or the impedance analyzer 332 discussed above may include processing circuitry that include one or more microprocessors, field programmable gate arrays, and/or integrated circuits. In alternative embodiments, the impedance analyzer 332 may include common and/or unique integrated circuits and/or circuitry that allows the system to operate as either an impedance system and/or a resistance detector system. Additionally or alternatively, the impedance analyzer 332 may include common and/or unique integrated circuits and/or circuitry to provide and/or convey the received signals to the sensor system controller 316 for processing. In some embodiments, the sensor system controller 316, the processor 244, and/or the controller 122 may include at least a portion of the impedance analyzer 332.

In some embodiments, the sensor 114 may include the sensor system controller 316. For example, the data acquisition circuitry 116 and/or the processor 244 discussed above may include at least a portion of the impedance analyzer 332, the excitation circuit 322, and/or the sensor system controller 316. In alternative or additional embodiments, the sensor system controller 316 may be disposed outside the sensor 114 operably coupled to the sensor 114. For example, the sensor system controller 316 may be coupled to the excitation/detection circuit 314 and the heater controller 306. The sensor system controller 316 may include one or more processing circuits including one or more processors, microprocessors, field programmable gate arrays, and/or integrated circuits. For example, the processor 244 and/or the controller 122 discussed above may include at least a portion of the sensor system controller 316.

In some cases, the sensor system controller 316 may include one or multiple processing units each performing one or more functions to analyze a group of response signals and determine gas responses. The sensor system controller 316 may receive response signals based on applying the stimulus signals. For example, the sensor system controller 316 may include a processor unit for gathering the response signals having one or multiple excitation frequencies based on applying the stimulus signals with the one or multiple excitation frequencies. The sensor system controller 316 may determine the gas responses by determining (e.g., unmixing, deconvoluting) effects of the analyte gas on the response signals. The sensor system controller 316 may use the temperature based correction (baseline drift correction) to remove an effect of variable ambient conditions, among other things, to facilitate reducing the baseline drift and noises of the gas responses and provide gas responses with improved linearity. The sensor system controller 316 can also be on the same board as the sensor. When the sensor system controller 316 is on the same board as the sensor, the resulting sensor system is known as edge-based sensor system.

FIGS. 5-8 describe a process 350, a graph 380, a graph 390, and a process 430 associated with performing the temperature based correction (baseline drift correction) by the sensor 114 described above with respect to FIGS. 1-4. In some cases, the sensor 114 may provide gas responses with reduced baseline drift of the gas responses based on performing at least a part of the processes 350 and/or 430. In specific cases, the sensor 114 may also have improved power consumption, improved response sensitivity, improved response times, and improved recovery times, reduced warm up time, among other things, when measuring the concentration of the analyte gases by reducing the baseline drift of the gas responses.

Figure 5:
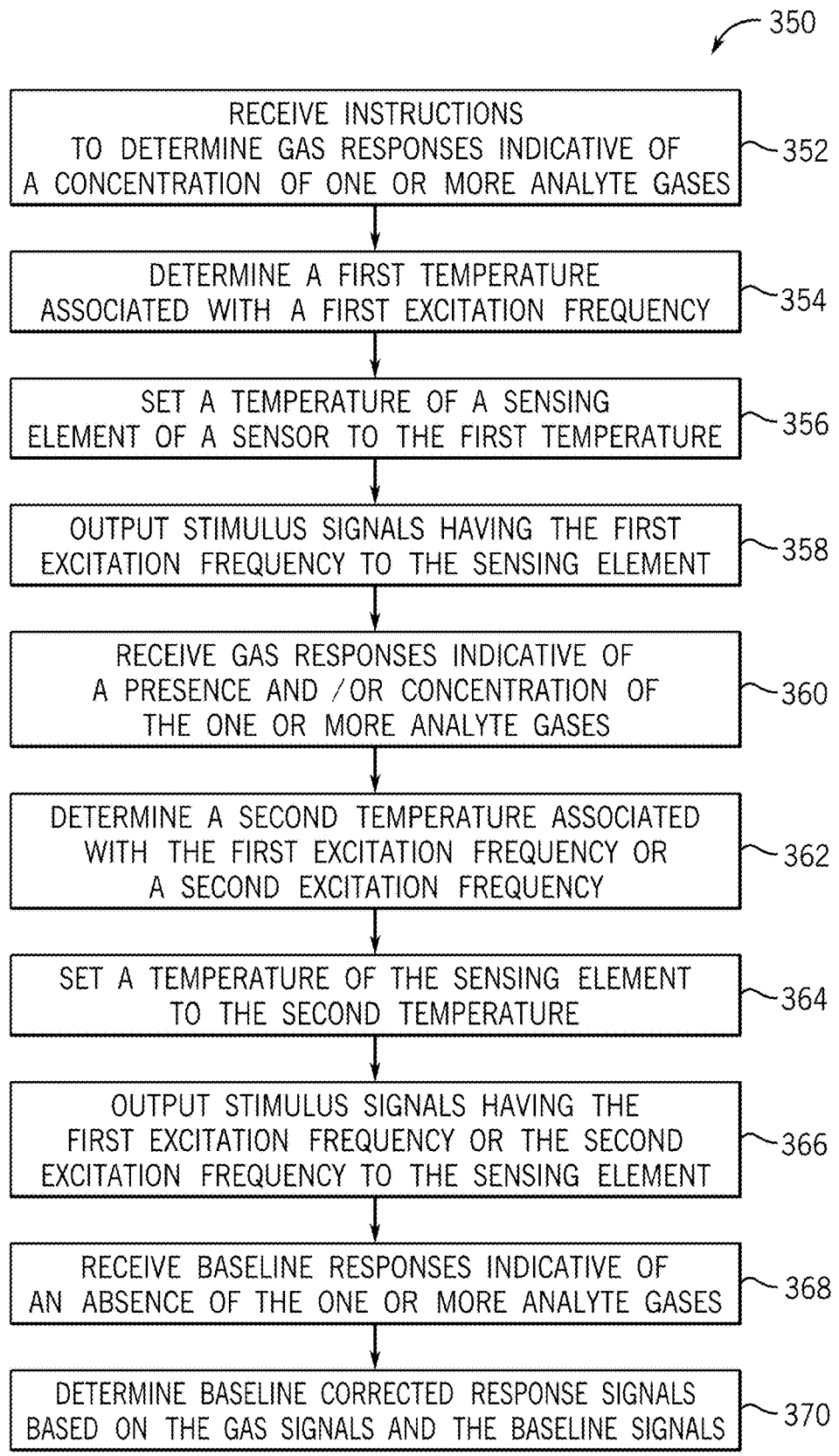
FIG. 5 is a process for reducing the baseline drift of the sensor of FIGS. 1-4 using a temperature based correction baseline drift correction, according to embodiments of the present disclosed subject matter.

FIG. 5 is the process 350 for reducing the baseline drift of the sensor 114 using the temperature based baseline drift correction. The process 350 may be performed by a controller such as the excitation circuit 322 and the impedance analyzer 332, the controller 122, the processor 244, the sensor system controller 316, or any other viable processing circuit. Moreover, in some embodiments, a tangible and non-transitory computer readable storage medium, such as the memory 242 may store and provide at least a portion of the instructions for performing the functions described herein. It should be appreciated that the process blocks described are by the way of example, and in alternative or additional embodiments, additional or reduced process blocks may be performed. Moreover, although the process blocks are described in a particular order, in alternative or additional embodiments, the process blocks may be performed in a different order.

At block 352, the sensor system controller 316 receives instructions to determine gas responses indicative of a concentration of one or more analyte gases in proximity and/or contact with the sensing element 238. At block 354, the sensor system controller 316 determines a first excitation frequency of stimulus signals and a first temperature of the sensing element 238 to detect a presence and/or a concentration of the one or more analyte gases. For example, the first excitation frequency may correspond to a single excitation frequency value or a range of excitation frequency values of the first excitation frequency. In some cases, the sensor system controller 316 may reference the memory device 242 of the sensor 114 discussed above with respect to FIG. 3 to determine the first excitation frequency and the first temperature based on receiving the excitation parameters for providing the stimulus signals to the sensing element 238. As mentioned above, the excitation parameters may include one or multiple excitation frequencies for providing the stimulus signals to the sensing element 238.

Figure 6:
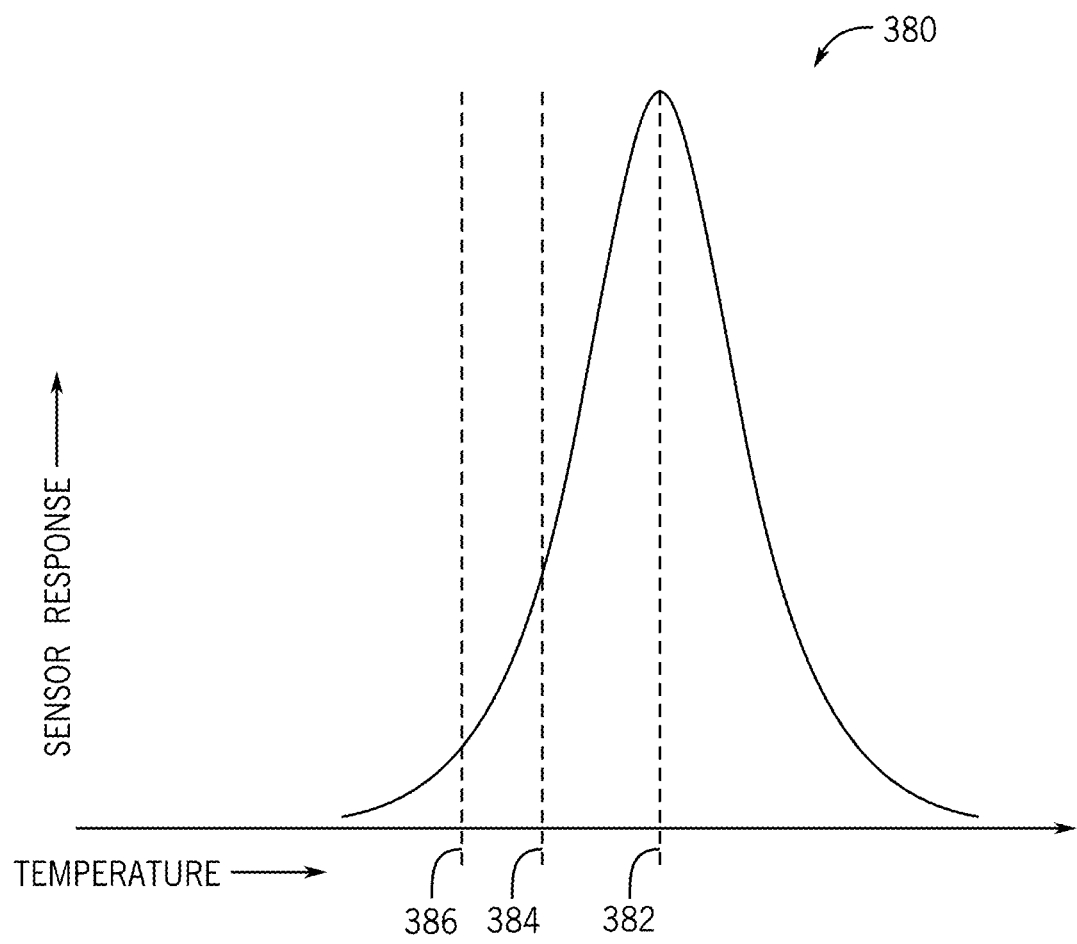
FIG. 6 is a graph depicting sensor responses of a sensing element of the sensor of FIGS. 1-4 in response to multiple temperatures, according to embodiments of the present disclosed subject matter.

At block 356, the sensor system controller 316 sets a temperature of the sensing element 238 based on the first temperature. For example, the sensor system controller 316 may instruct (e.g., provide control signals to) the heater controller 306 to adjust the temperature of the sensing element 238 based on the first temperature by adjusting a temperature of the heating element 304. By the way of example, FIG. 6 illustrates the graph 380 depicting sensor responses of the sensing element 238 in response to multiple temperatures of the sensing element 238 including a first temperature 382. The first temperature 382 may correspond to a temperature of the sensing element 238, the heating element 304, or both.

Referring back to FIG. 5, at block 358, the sensor system controller 316 outputs (e.g., applies) the stimulus signals having the first excitation frequency to the sensing material 236 of the sensing element 238. For example, the excitation circuit 322 may apply the stimulus signals having the first excitation frequency to the sensing material 236 of the sensing element 238 in response to receiving instructions from the sensor system controller 316. Moreover, the sensing material 236, the heating element 304, or both may have the first temperature 382 when the sensing material 236 receives the stimulus signals.

It should be appreciated that the sensor system controller 316 may include one or multiple processing units each performing one or more functions to provide the control signals and/or measure the sensor response. The excitation circuit 322 of the excitation/detection circuit 314 may include circuitry to generate the stimulus signals to interrogate the sensing material 236. For example, the excitation circuit 322 may generate the stimulus signal based on the one or more control signals indicative of an excitation frequency, integration time, and/or an amplitude of the stimulus signal from the selector 240. The excitation circuit 322 may provide the stimulus signal to the sensing electrodes 310 and 312 and thereby to the sensing material 236. Moreover, the stimulated electrodes 310 and 312 and the sensing material 236 may provide one or more response signals based on receiving the stimulus signal and exposure to the one or more analyte gases. For example, the excitation circuit 322 may receive the control signals from sensor system controller 316, the processor 244 of the sensor 114 discussed with respect to FIG. 3, the controller 122 associated with the sensor 114 discussed with respect to FIG. 1, among other things.

In any case, at block 360, the sensor system controller 316 receives gas responses (e.g., response signals, electrical response signals) indicative of a presence and/or concentration of the one or more analyte gases in response to outputting the stimulus signals. The sensing element 238 may provide the gas responses based on receiving the stimulus signals with the first operational excitation frequency and having the first temperature 382.

Example 1

Figure 7:
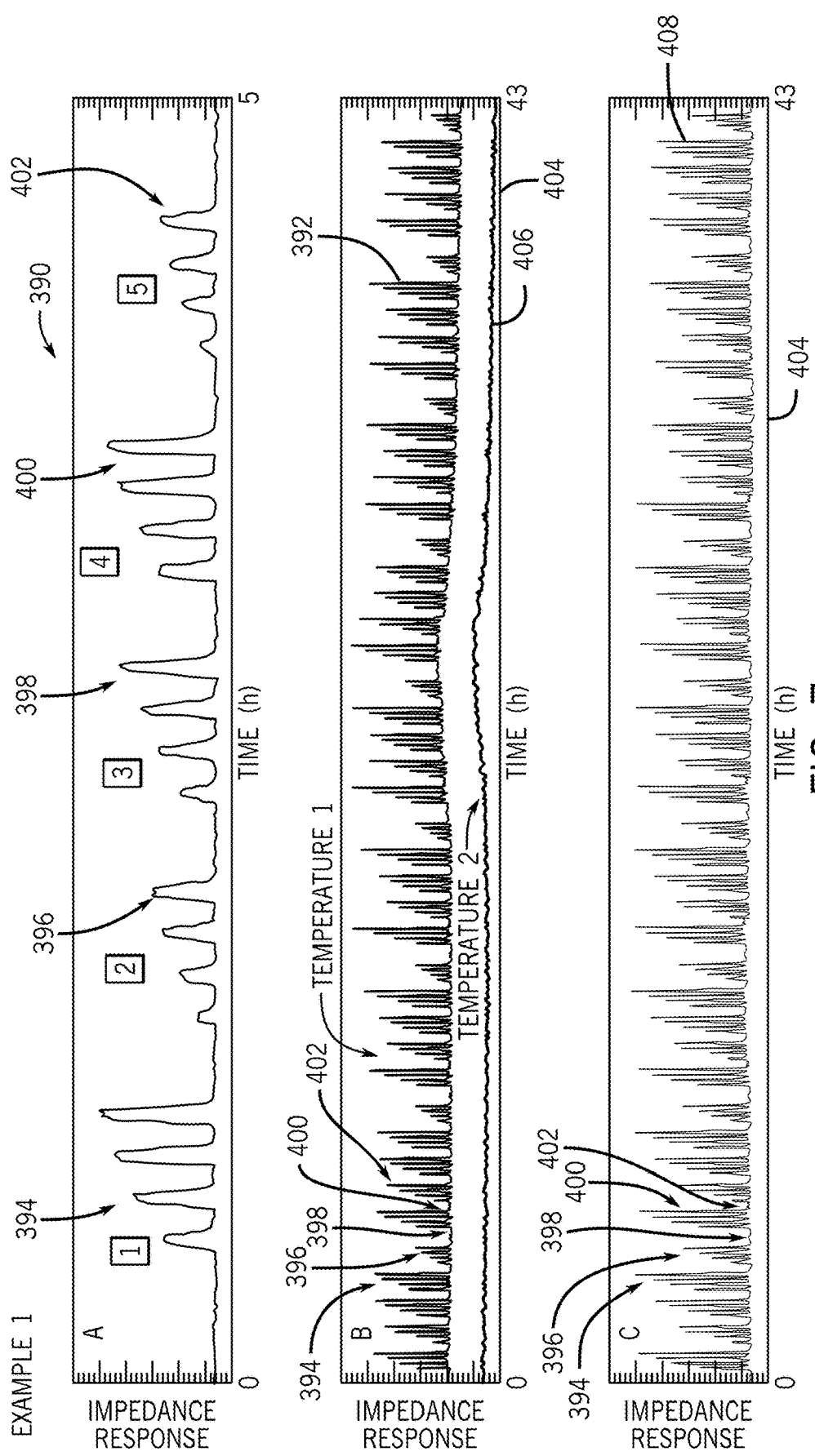
FIG. 7 illustrates a first example of impedance responses of a metal oxide sensing element at two different operational temperatures to five gases of interest, according to embodiments of the disclosed subject matter.

By the way of example, FIG. 7 illustrates the graph 390 depicting example 1 of gas responses 392. The gas responses 392 may include a first gas response 394 associated with a first analyte gas, a second gas response 396 associated with a second analyte gas, a third gas response 398 associated with a third analyte gas, a fourth gas response 400 associated with a fourth analyte gas, and a fifth gas response 402 associated with a fifth analyte gas. In the depicted graph 390, the first analyte gas, the second analyte gas, the third analyte gas, the fourth analyte gas, and the fifth analyte gas may be exposed (presented) to the sensing material 236 periodically over a time 404. As such, the gas responses 392 may include periodic response to the first analyte gas, the second analyte gas, the third analyte gas, the fourth analyte gas, and the fifth analyte gas. It should be appreciated that the graph 390 is an example and the gas responses 392 may have different values and/or trends in different cases, for example, based on different concentrations and/or exposure times of the analyte gases.

In some embodiments, the impedance analyzer 332 discussed above may receive the gas responses 392 from the sensing electrodes 310 and 312. The gas responses 392 may indicate the electrical impedance or the impedance response of the sensing element 238 during exposure of the sensing material 236 to the analyte gases. The sensor system controller 316, the impedance analyzer 332, or both may receive and analyze the gas responses 392 based on the first excitation frequency of the stimulus signals and the first temperature 382 of the sensing element 238, the heating element 304, or both. The sensor system controller 316 may use any viable method or technique to examine the electrical impedance of the sensing element 238 to determine the presence and/or amount (e.g., concentration) of the analyte gases in the environment to which the sensing material 236 is exposed. If not compensated for, in some cases, the gas responses 392 may exhibit a baseline drift (e.g., a baseline impedance drift) based on environmental or electrical sources and/or various other variables such as ambient conditions at the sensor 114. The sensor system controller 316 and/or the impedance analyzer 332 may analyze the response sensor signals generated by the stimulus signals generated using the first excitation frequency at multiple temperatures to reduce the baseline drift, as discussed herein.

Referring back to FIG. 5, at block 362, the sensor system controller 316 determines a second temperature of the sensing element 238 and the first excitation frequency or a second excitation frequency of the stimulus signals to determine baseline responses of the sensing element 238. As discussed above, the baseline responses may be associated with the concentration of the analyte gas being below a threshold (e.g., 0, near 0) in proximity of or in contact with the sensing element 238 with no regard to whether the analyte gases are present. It should be appreciated that the second temperature of the sensing element 238 may be associated with the first excitation frequency, the second excitation frequency, and/or other excitation frequencies for providing the stimulus signals to the sensing element 238 to determine baseline responses of the sensing element 238. FIG. 6 depicts a second temperature 384 of the sensing element 238 associated with outputting the baseline responses by the sensing element 238. For example, the sensor system controller 316 may instruct the heater controller 306 to adjust the temperature of the sensing element 238 based on the second temperature by adjusting a temperature of the heating element 304. In some cases, the first temperature 382 and the second temperature 384 may be stored in the memory device 242 of the sensor 114.

Referring back to FIG. 5, at block 364, the sensor system controller 316 sets a temperature of the sensing element 238 based on the second temperature. For example, the sensor system controller 316 may instruct (e.g., provide control signals to) the heater controller 306 to adjust the temperature of the sensing element 238 based on the second temperature by adjusting a temperature of the heating element 304.

At block 366, the sensor system controller 316 outputs (e.g., applies) stimulus signals having the first excitation frequency or the second excitation frequency to the sensing material 236. For example, the excitation circuit 322 may apply the stimulus signals having the first excitation frequency or the second excitation frequency to the sensing material 236 of the sensing element 238 in response to receiving instructions from the sensor system controller 316. Moreover, the sensing material 236, the heating element 304, or both may have the second temperature 384 when the sensing material 236 receives the stimulus signals.

At block 368, the sensor system controller 316 receives baseline responses (e.g., response signals, electrical response signals) based on generating the stimulus signals with the first operational excitation frequency at the second temperature. As mentioned above, the sensing element 238 may generate the baseline responses based on receiving the stimulus signals with the first operational excitation frequency or the second operational excitation frequency when operating at the second temperature.

As an illustration, drift-correction methodology was applied to a MOS sensor operated under its dielectric (AC) excitation when detecting five volatiles isobutylene (1), acetonitrile (2), propane (3), acetone (4) and methane (5). Concentrations of all volatiles were 7.2, 14.5, 21.8, and 29.1 ppm. FIG. 7 includes a graph A showing results of a single replicate exposure to all five volatiles at four concentrations of each volatile over the five hours of exposures. The responses of the MOS sensor to five volatiles were linear as a function of concentrations of the volatiles because the operation of a MOS sensor under its dielectric AC excitation provides a known linear response. In contrast, when the readout (measurement) of MOS materials is conventionally performed by measuring resistance change of the material as a function of gas concentration, such a relationship follows a well-known power law, with saturation of sensor response occurring at high concentrations.

Two levels of operating temperatures of the heater were selected and were repeatedly (sequentially and periodically) varying during the test. The sensor impedance at one operational frequency and at two voltages (two temperatures of the heater) is illustrated in graph B of FIG. 7 that shows the sensor impedance for 43 hours.

Temperature number 1 (T1) of the heater corresponded to heater voltage 1 of 5 V and was periodically applied for 10 seconds. The heater voltage 1 of 5V was the nominal heater voltage for the sensor if operated with resistance readout. Temperature number 2 (T2) of the heater corresponded to heater voltage 2 of 2 V and was also periodically applied for 10 seconds. The heater voltage 2 of 2 V was below the nominal heater voltage for the sensor if operated with resistance readout.

At FIG. 7, the graph 390 depicts baseline response 406. A sensor baseline response 406 may correspond to the sensor response when an analyte gas is un-detectable, i.e., when the sensor response in the presence of the analyte gas has a similar magnitude as the sensor response in the absence of the analyte gas when measurements are done at a given temperature of the heater 304.

For example, the baseline responses 406 may correspond to an absence of the analyte gases or to the presence of analyte gases when measurements are done at a given temperature of the heater.

Referring back to FIG. 5, at block 370, the sensor system controller 316 determines baseline corrected response signals based on the gas responses 392 and the baseline responses 406. For example, the sensor system controller 316 may subtract the gas responses 392 and the baseline responses 406 to determine the baseline corrected response signals.

At FIG. 7, the graph 390 depicts baseline corrected response signals 408 based on the gas responses 392 and the baseline responses 406. For example, the sensor system controller 316, the impedance analyzer 332, or both may subtract the baseline responses 406 from the gas responses 392 to generate the baseline corrected response signals 408 with reduced baseline drift. The baseline corrected response signals 408 may include the first gas response 394 associated with the first analyte gas, the second gas response 396 associated with the second analyte gas, the third gas response 398 associated with the third analyte gas, the fourth gas response 400 associated with the fourth analyte gas, and the fifth gas response 402 associated with the fifth analyte gas with reduced baseline drift. This baseline drift-correction methodology that was applied to a MOS sensor operated under its dielectric (AC) excitation also preserved the linear responses of the MOS sensor to the tested volatiles (gases).

Thus, this example #1 illustrates the ability of a single MOS sensor at one operational frequency to operate with a heater voltage profile that provided reduced baseline drift. To reduce baseline drift, the heater voltage profile was at two levels of operating temperatures of the heater that were periodically varying during the test where the first temperature of the heater corresponded to nominal heater voltage for the MOS sensor if operated with resistance readout and the second temperature of the heater corresponded to below the nominal heater voltage for the sensor if operated with resistance readout. Thus, the controller may select at least one operational frequency of the MOS sensor that provides an improved stability of sensor baseline over the conventional non-selected and/or resistance measurements of the sensor and may select the second operating voltage (temperature) of the heater that is below the nominal heater voltage (temperature) over the conventional non-selected and/or resistance measurements of the sensor where the second operating voltage (temperature) of the heater that is above the nominal heater voltage when a resistance readout is implemented. Operation of the sensor where the second operational (i.e. operating) voltage (temperature) of the heater is above the nominal heater voltage is undesirable from the standpoint of additional needed power consumption and reduced battery life.

One or more embodiments of the sensor system described herein can incorporate the sensor, where the sensor is connected to the impedance analyzer that applies an alternating current (AC) through the sensing electrodes at one or more operational frequencies for excitation of the sensing material. The impedance analyzer measures the response of the sensor to different gases, where the range of operational frequencies for gas analysis is selected to be at operational frequencies around the inflection point of the imaginary part of the impedance spectrum of the sensor. The inflection point of the imaginary part of the impedance spectrum is also known as the relaxation peak or the relaxation point of the relaxation region of the imaginary part of the impedance spectrum of the sensing material. Such operation of a MOS sensor also is known as "operation under its dielectric (AC) excitation" and as "applying an AC through the sensing electrodes at one or more operational frequencies for excitation of the sensing material".

In one or more embodiments described herein, the impedance analyzer selects one or more responses of the multiple responses from the sensor that provide improved stability of sensor baseline, improved response sensitivity of the sensor to different gases, reduced warm-up time, improved differentiation between multiple gases, improved quantification of multiple gases, improved classification of multiple individual gases, enhanced responses to particular gases, reduced responses to particular gases, correction of the sensor baseline drift, correction of the sensor sensitivity drift, improvement of statistical mixture decomposition, reduction of sensor response time or one or more combinations thereof over the conventional non-selected and/or resistance measurements of the MOS sensor.

As such, the temperature based baseline drift correction may improve accuracy of the response signals of the sensor 114. It should be appreciated that the sensor system controller 316 may use any viable method or technique to more accurately examine the electrical impedance of the sensing element 238 based on the baseline corrected response signals 408 to determine the presence and/or amount (e.g., concentration) of the analyte gases in the environment to which the sensing material 236 is exposed. Moreover, although in the process 350 described above the sensor system controller 316 determines the baseline corrected response signals 408 based on a first temperature 382 and a second temperature 384, in alternative or additional embodiments, the sensor system controller 316 may use a third temperature 386 (shown in FIG. 6), a fourth temperature, and so on. Similarly, the sensor system controller 316 may use the first excitation frequency, the second excitation frequency, a third excitation frequency, and so on with such temperatures.

Besides of the two levels of operating temperatures of the heater that were selected and were repeatedly (sequentially and periodically) varying during the test described in FIG. 7, other embodiments of temperature (voltage) variations may be utilized.

Temperature modulation (also known as temperature-programming, temperature-cycling) of MOS sensors with impedance readout may be applied on different time scales from milliseconds, to seconds, and to tens of seconds. Different temperature modulation profiles using different profiles of voltages may be applied such as linear steps from low to high voltage, linear steps from high to low voltage, saw tooth, sinusoidal, multi-frequency, voltage jump waveforms, voltage smooth waveforms, and any other known in the art.

Figure 8:
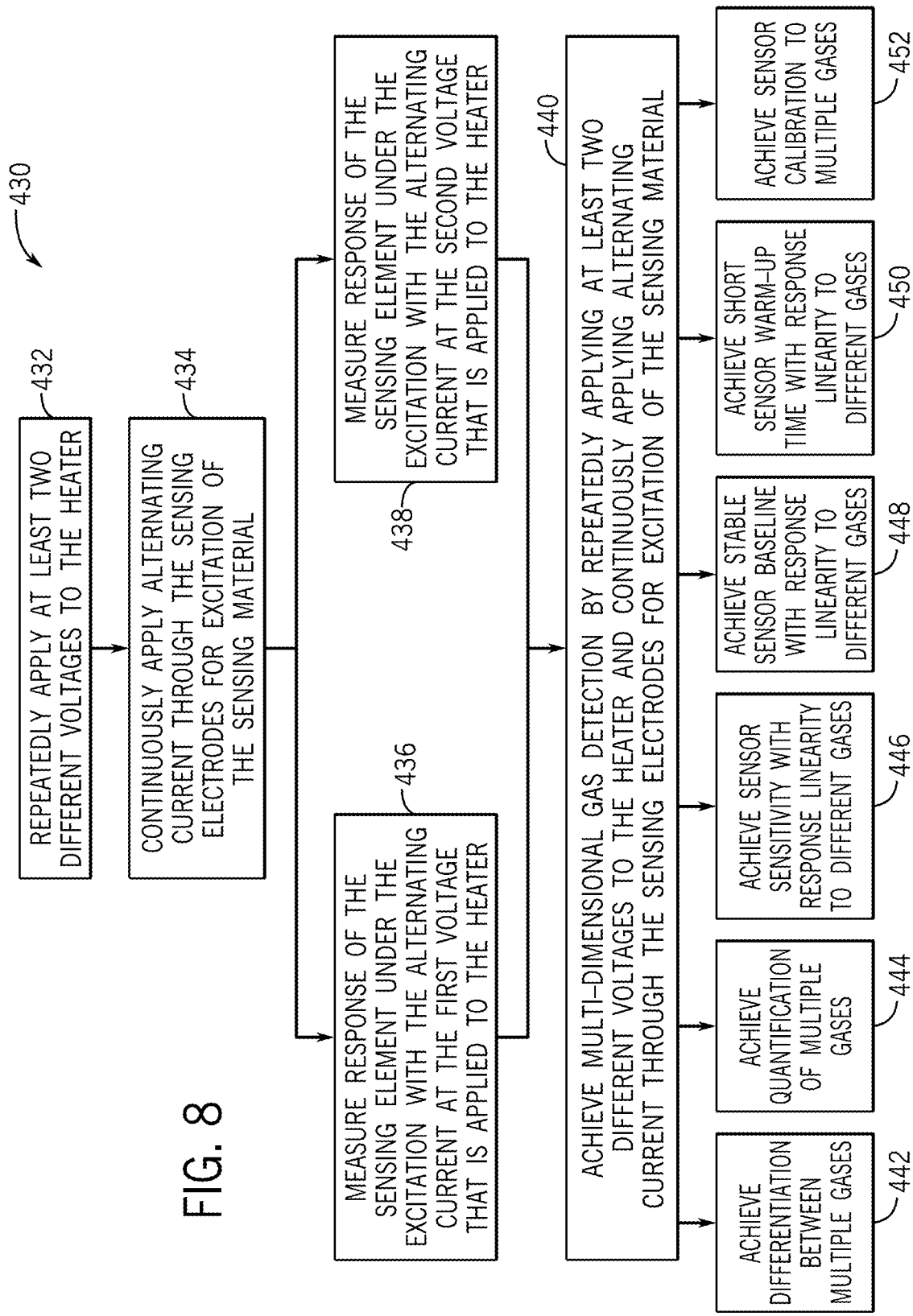
FIG. 8 is a process for achieving stable sensor baseline when differentiating and quantifying analyte gases by the sensor of FIGS. 1-4, according to embodiments of the present disclosed subject matter.

FIG. 8 is the process 430 for reducing the baseline drift of the sensor 114 using the temperature based baseline drift correction. The process 430 may be performed by a controller such as the excitation circuit 322 and the impedance analyzer 332, the controller 122, the processor 244, the sensor system controller 316, or any other viable processing circuit. Moreover, in some embodiments, a tangible and non-transitory computer readable storage medium, such as the memory 242 may store and provide at least a portion of the instructions for performing the functions described herein. It should be appreciated that the process blocks described are by the way of example, and in alternative or additional embodiments, additional or reduced process blocks may be performed. Moreover, although the process blocks are described in a particular order, in alternative or additional embodiments, the process blocks may be performed in a different order.

At block 432, the sensor system controller 316 repeatedly applies at least two different voltages to the heater (e.g., the heating element 304). At block 434, the sensor system controller 316 continuously applies alternating current through the sensing electrodes 310 and 312 at one or more operational frequencies for excitation of the sensing material 236. The sensing element 238 may be in operational contact with a gas sample that may include one or more of analyte gases. At block 436, the sensor system controller 316 measures gas responses of the sensing element 238 under the excitation with the alternating current at one or more operational frequencies at the first voltage that is applied to the heater (e.g., the heating element 304). At block 438, the sensor system controller 316 measures gas responses of the sensing element 238 under the excitation with the alternating current at one or more frequencies at the second voltage that is applied to the heater (e.g., the heating element 304).

At block 440, the sensor system controller 316 may achieve multi-dimensional gas detection by repeatedly applying at least the two different voltages to the heater (e.g., the heating element 304) and continuously applying alternating current through the sensing electrodes 310 and 312 at two or more different operational frequencies for excitation of the sensing material 236.

Existing gas sensors are single-output sensors (for example having resistance, or electrical current, or light intensity signals from individual sensors). Such sensors are known as zero-order sensors or zero-order analytical instruments. Any zero-order sensor is undesirably affected by variable chemical background (interferences) and sensor drift that cannot be distinguished from the response to an analyte. To address these limitations, there may be gas sensors with one or more independent variables in the sensor responses. If there is one independent variable in a sensor responses, such sensor is a first-order sensor.

There may be several non-limiting examples of independent variables of a first-order sensor. In the first non-limiting example, an independent variable of a first-order sensor may be wavelengths of light to record an optical spectrum by an individual sensor rather than only a light intensity at a single wavelength.

In the second non-limiting example, an independent variable of a first-order sensor may be impedance of a sensing material (or a sensor) recorded at different frequencies of an alternating electrical current that is exciting this sensing material of an individual sensor rather than only a resistance of this sensing material (sensor) with a direct current measurement.

In the third non-limiting example, an independent variable of a first-order sensor may be an operational voltage or an operational temperature of a heater of a MOS sensor with a resistance of this MOS sensor recorded at different operational voltages of a heater.

In the fourth non-limiting example, an independent variable of a first-order sensor may be an operational voltage or an operational temperature of a heater of a MOS sensor with an impedance of this MOS sensor recorded at different operational voltages of a heater at a single frequency of impedance.

If there are two independent variables in a sensor response, such sensor is a second-order sensor. There may be several non-limiting examples of independent variables of a second-order sensor.

In one non-limiting example, a second-order sensor may have first independent variable such as wavelengths of light that illuminate the sensor and a second independent variable such as impedance of the sensor recorded at different frequencies of an alternating electrical current that is exciting the sensor.

In another non-limiting example, a second-order sensor may have first independent variable such as voltages of the heater of a MOS sensor and a second independent variable such as impedance of the MOS sensor recorded at different frequencies of an alternating electrical current that is exciting the MOS sensor.

Similarly, there may be three independent variables in a sensor response, so such sensor may be a third-order sensor.

The zero-, first, second- and higher order sensors (analytical instruments) are also known as sensors that provide a zero-dimensional, a one-dimensional, a two-dimensional, or a higher-dimensional response by an individual sensor.

At block 442, the sensor system controller 316 achieves differentiation between multiple analyte gases. At block 444, the sensor system controller 316 achieves quantification of the multiple analyte gases. At block 446, the sensor system controller 316 achieves sensitivity of the sensor 114 (e.g., a multivariable gas sensor 114) to the different analyte gases. At block 448, the sensor system controller 316 achieves stable sensor baseline.

At block 442, the sensor system controller 316 may achieve improved differentiation between multiple analyte gases; at block 444, the sensor system controller 316 may achieve improved quantification of the multiple analyte gases; at block 446, the sensor system controller 316 may achieve improved sensitivity of the sensor 114 (e.g., a multivariable gas sensor 114) to different analyte gases with response linearity to different analyte gases; at block 448, the sensor system controller 316 may achieve improved stability of the sensor baseline with response linearity to different analyte gases; at block 450, the sensor system controller 316 may achieve reduced warm up time of the sensor; at block 452, the sensor system controller 316 may achieve simplified calibration of the sensor to multiple analyte gases as compared to non-selected sensor response, the non-selected sensor response is resistance of sensor response when the sensor operates with at least two different voltages applied to the heater or when sensor response is sensor impedance response when the sensor operates at a constant voltage applied to the heater.

Improved multi-gas differentiation may be achieved by operating the MOS sensing element under its dielectric (AC) excitation with one or more operational frequencies and with two or more operational voltages of the sensor heater as compared to non-selected sensor response.

Frequency-dependent MOS sensor linearity, sensor range of measured gas concentrations, sensor sensitivity, sensor warm-up time may be also controlled by the selection of the operational voltage of the MOS sensor heater.

Different specific operational frequencies of the MOS sensor under its dielectric (AC) excitation may be coupled with different specific operational voltages of the sensor heater to be applicable for specific tasks performed by the controller, such as to perform classification of multiple individual gases, to perform quantification (quantitation) of multiple individual gases, to enhance responses to particular gases, to reduce responses to particular gases, to correct the sensor baseline drift, to correct the sensor sensitivity drift, to reduce sensor warm up time, to improve statistical decomposition of individual gases in their simple and complex mixtures, and to simplify sensor calibration to multiple gases by reducing the number of gas concentrations used for calibration.

In accordance with embodiments of this invention, a sensing element may operate when at least two different voltages that are repeatedly applied to the heater in combination with applying an alternating current through the sensing electrodes at one or more operational frequencies for excitation of the sensing material. Different voltages that are applied to the heater result in corresponding different operational temperatures of the heater (i.e., heating element).

Variation of operational temperatures represent one of several types of operational energy—such as thermal energy—that may be repeatedly varied by applying at least two different voltages to the heater and at the same time by applying an alternating current through the sensing electrodes at one or more operational frequencies for excitation of the sensing material to achieve a desired improved classification of multiple individual gases, improved quantification (quantitation) of multiple individual gases, enhanced responses to particular gases, reduced responses to particular gases, correction of sensor baseline drift (improved stability of sensor baseline), correction of sensor sensitivity drift, reduced sensor warm up time, improved statistical decomposition of individual gases in their simple and complex mixtures, and simplified sensor to multiple gases by reducing the number of gas concentrations used for calibration, or one or more combinations thereof. Variations in temperatures may be in the range from −50° C. to +1000° C., including in the range from +20° C. to +800° C., and the range from +25° C. to +700° C.

Besides variation of temperatures, other types of operational energy that may be applied may involve radiant and mechanical (or acoustic) types of operational energy. In an embodiment, radiant energy may be varied to achieve a desired improved classification of multiple individual gases, improved quantification (quantitation) of multiple individual gases, enhanced responses to particular gases, reduced responses to particular gases, correction of sensor baseline drift (improved stability of sensor baseline), correction of sensor sensitivity drift, reduced sensor warm up time, improved statistical decomposition of individual gases in their simple and complex mixtures, and simplified sensor calibration to multiple gases by reducing the number of gas concentrations used for calibration, or one or more combinations thereof. Radiant energy may employ variations in wavelength, and/or variations in intensity of radiant energy. Variations in wavelength of radiant energy may be in the range from the ultraviolet light to the visible light and to the infrared light. Variations in intensity of radiant energy may be in the range from 0.00001 milliWatts per $cm^2$ to 10000 milliWatts per $cm^2$, including in the range from 0.0001 milliWatts per $cm^2$ to 1000 milliWatts per $cm^2$, and the range from 0.001 milliWatts per $cm^2$ to 900 milliWatts per $cm^2$.

In an embodiment, mechanical (or acoustic) energy may be varied to achieve a desired improved classification of multiple individual gases, improved quantification (quantitation) of multiple individual gases, enhanced responses to particular gases, reduced responses to particular gases, correction of sensor baseline drift (improved stability of sensor baseline), correction of sensor sensitivity drift, reduced sensor warm up time, improved statistical decomposition of individual gases in their simple and complex mixtures, and simplified sensor calibration to multiple gases by reducing the number of gas concentrations used for calibration, or one or more combinations thereof. Mechanical (or acoustic) energy may employ variations in frequency of mechanical (or acoustic) energy. Variations in frequency of mechanical (or acoustic) energy may be in the range from 1 kHz to 10 GHz, including in the range from 10 kHz to 5 GHZ, and the range from 20 kHz to 4 GHz.

Different individual types of operational energy may be applied in combination with applying an alternating current through the sensing electrodes at one or more operational frequencies for excitation of the sensing material to achieve a desired improved classification of multiple individual gases, improved quantification (quantitation) of multiple individual gases, enhanced responses to particular gases, reduced responses to particular gases, correction of sensor baseline drift (improved stability of sensor baseline), correction of sensor sensitivity drift, reduced sensor warm up time, improved statistical decomposition of individual gases in their simple and complex mixtures, and simplified sensor calibration to multiple gases by reducing the number of gas concentrations used for calibration, or one or more combinations thereof.

Different types of operational energy may be combined to be applied in combination with applying an alternating current through the sensing electrodes at least at two different operational frequencies for excitation of the sensing material to achieve a desired improved classification of multiple individual gases, improved quantification (quantitation) of multiple individual gases, enhanced responses to particular gases, reduced responses to particular gases, correction of sensor baseline drift (improved stability of sensor baseline), correction of sensor sensitivity drift, reduced sensor warm up time, improved statistical decomposition of individual gases in their simple and complex mixtures, and simplified sensor calibration to multiple gases by reducing the number of gas concentrations used for calibration, or one or more combinations thereof.

In an embodiment, thermal energy may be applied in combination with radiant energy. In another embodiment, thermal energy may be applied in combination with mechanical (or acoustic) energy. In another embodiment, mechanical (or acoustic) energy may be applied in combination with radiant energy. In another embodiment, thermal energy may be applied in combination with radiant energy and mechanical (or acoustic) energy.

Example 2

Figure 9:
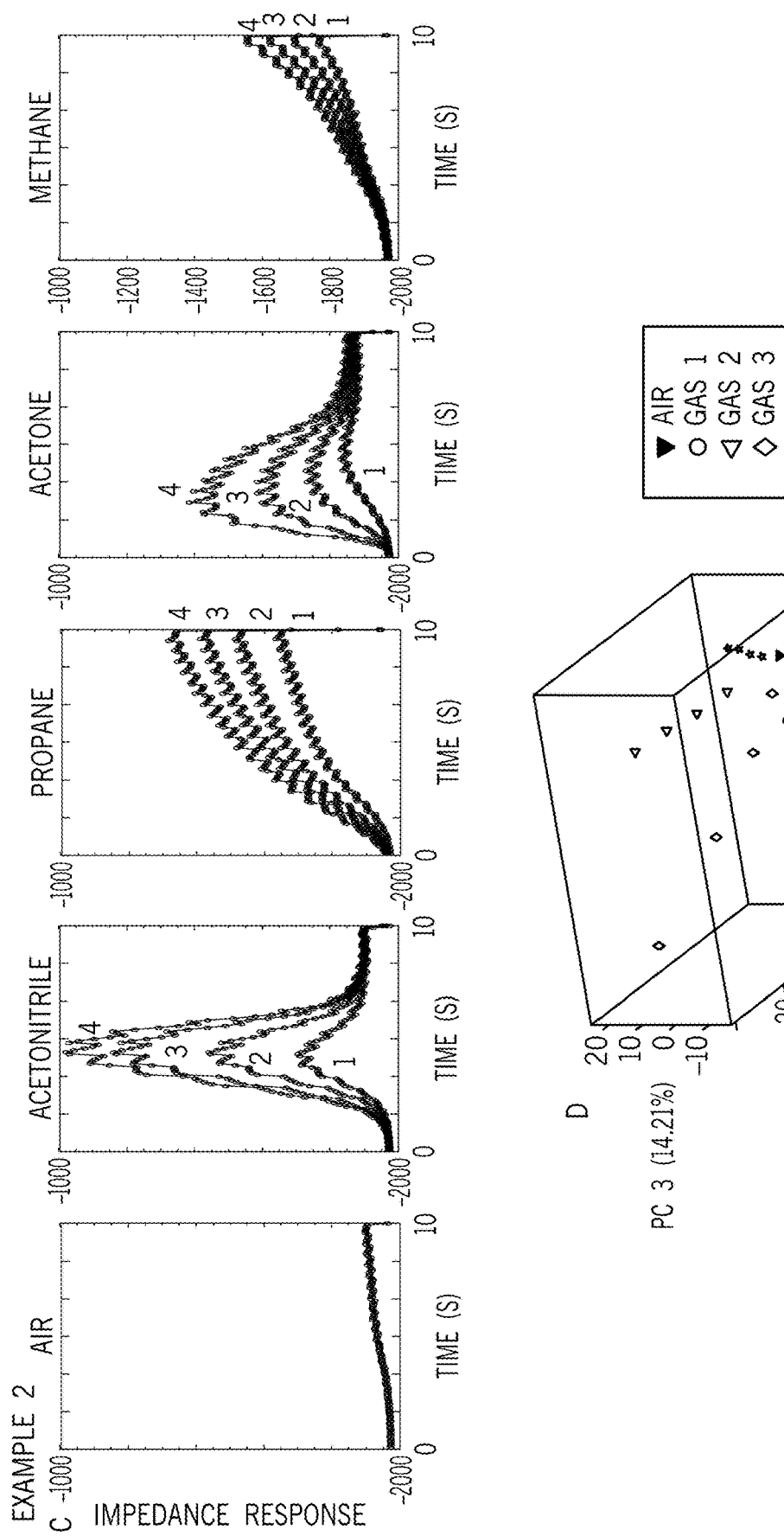

FIG. 9 illustrates an example 2. In this example we unexpectedly found that an individual MOS sensor may have different signatures of the impedance responses to different gases and to air when operated under its dielectric (AC) excitation and with a dynamic profile of different voltages applied to the MOS sensor heater.

Graph A of FIG. 9 depicts an illustrative example of a heater voltage profile where the heater voltage is linearly increased from 1.5 V to 2.5 V over 10 seconds. The temperature increase may be performed in 0.5 second steps in 0.05 V increments. After the voltage may reach 2.5 V, the heater voltage profile may be repeated sequentially and periodically.

Graph B of FIG. 9 depicts an illustrative example of an impedance response of an individual MOS sensor at an illustrative frequency under its dielectric (AC) excitation when the heater voltage profile shown in graph A of FIG. 9 was sequentially and periodically applied to the sensing material of the MOS sensor and the MOS sensor was sequentially exposed to air and to four volatiles such as acetonitrile (gas 1), propane (gas 2), acetone (gas 3), and methane (gas 4). Exposures to volatiles were performed using four concentrations for each volatile. Acetonitrile was at 7.2, 14.5, 21.8, and 29 ppm. Propane was at 7.2, 14.5, 21.8, and 29 ppm. Acetone was at 7.2, 14.5, 21.8, and 29 ppm. Methane was at 33.3, 66.7, 100, and 133.3 ppm. The term "gas" in this specification is same as "vapor" or "volatile".

Graph C of FIG. 9 depicts dynamic signatures of the impedance response of the MOS sensor at the illustrative frequency under its dielectric (AC) excitation when the heater voltage profile shown in graph A of FIG. 9 was sequentially and periodically applied to the sensing material of the MOS sensor and the MOS sensor was sequentially exposed to air and to four volatiles such as acetonitrile (gas 1), propane (gas 2), acetone (gas 3), and methane (gas 4). Four gases were at their four respective concentrations (1-4) as numbered in graph C of FIG. 9.

The dynamic signatures of the impedance responses to air and four gases over 10-second temperature cycles were different by several illustrative metrics parameters such as (1) overall impedance response intensity; (2) existence of a maximum in the impedance response over the 10-second temperature cycle; (3) position of a maximum in the impedance response over the 10-second temperature cycle; (4) concave or convex impedance response over the 10-second temperature cycle. Besides these illustrative metrics parameters, there may be any other metrics parameters.

The dynamic signatures of the impedance responses to air and four gases over 10-second temperature cycles may serve as inputs to the principal components analysis (PCA) tool. PCA may be a pattern recognition method that explains the variance of the data as the weighted sums of the original variables, known as principal components (PCs). Resolution between the dynamic signatures of the impedance responses to air and four individual gases over 10-second temperature cycles may be illustrated in graph D of FIG. 9 that depicts a scores plot of a developed PCA model.

By using multivariate analysis of the dynamic signatures of the impedance responses to air and four gases over 10-second temperature cycles, classification (differentiation) and quantitation (quantification) of volatiles may be performed. Examples of classification methods include but are not limited to Principal Component Analysis (PCA), Independent Component Analysis (ICA), Linear Discriminant Analysis (LDA), and Support Vector Machines (SVM) algorithm. Nonlimiting examples of methods for performing quantitation of an analyte to determine the concentration of an individual analyte or a particular analyte in a mixture include Principal Component Regression (PCR), Independent Component Regression (ICR), and Support Vector Regression (SVR).

Thus, FIG. 9 illustrates the ability of an individual MOS sensor at one operational frequency to operate with a heater voltage profile that created diverse dynamic signatures of the impedance responses to air and different gases. One or more excitation operational frequencies and a measured impedance of the MOS sensor response may be combined with different voltages applied to the MOS sensor heater to perform operations of classification of multiple gases and quantitation of multiple gases.

FIG. 10 depicts PCA results of analysis of the dynamic signatures of the impedance responses of one MOS sensor at one operational frequency to illustrative gases and their mixtures over 10-second temperature cycles.

Resolution between the dynamic signatures of the impedance responses of one MOS sensor at one operational frequency to air and two gases such as isobutylene (gas 1) and acetonitrile (gas 2) and their binary mixtures over 10-second temperature cycles may be illustrated in Graph A of FIG. 10 that depicts a scores plot of a developed PCA model. The concentrations of isobutylene (gas 1) and acetonitrile (gas 2) as individual gases and their binary mixtures are depicted in Table 1 below.

Resolution between the dynamic signatures of the impedance responses of one MOS sensor at one operational frequency to air and two gases such as propane (gas 3) and acetone (gas 4) and their binary mixtures over 10-second temperature cycles may be illustrated in Graph B of FIG. 10 that depicts a scores plot of a developed PCA model. The concentrations of propane (gas 3) and acetone (gas 4) as individual gases and their binary mixtures are depicted in Table 2 below.

Resolution between the dynamic signatures of the impedance responses of one MOS sensor at one operational frequency to air and three gases such as isobutylene (gas 1), acetonitrile (gas 2), and propane (gas 3) and their ternary mixtures over 10-second temperature cycles may be illustrated in Graph C of FIG. 10 that depicts a scores plot of a developed PCA model. The concentrations of isobutylene (gas 1), acetonitrile (gas 2), and propane (gas 3) as individual gases and their ternary mixtures are depicted in Table 3 below.

Thus, Graphs A, B, and C of FIG. 10 illustrate the ability of an individual MOS sensor at one operational frequency and with the heater voltage profile that was repeated sequentially and periodically to differentiate between different gases and their binary and ternary mixtures.

Graphs A, B, C, and D of FIG. 9 illustrate graphical illustrations of a heater voltage profile that was repeated sequentially and periodically to a metal oxide sensing element, resulting dynamic impedance responses of the metal oxide sensing element to four gases of interest and to air, and differentiation between individual four gases and air, according to embodiments of the disclosed subject matter. Graphs A, B, and C of FIG. 10 illustrates graphical illustrations of differentiation between different gases and their binary and ternary mixtures and air, according to embodiments of the disclosed subject matter.

TABLE 1

Concentration profiles for individual gases gas 1
and gas 2 and their binary mixtures gas 1 + gas 2.

| Steps | Gas 1 (ppm) | Gas 2 (ppm) |
|---|---|---|
| 1 | 0 | 0 |
| 2 | 7.27 | 0 |
| 3 | 14.5 | 0 |
| 4 | 21.8 | 0 |
| 5 | 29.1 | 0 |
| 6 | 0 | 7.27 |
| 7 | 0 | 14.5 |
| 8 | 0 | 21.8 |
| 9 | 0 | 29.1 |
| 10 | 7.27 | 7.27 |
| 11 | 14.5 | 14.5 |
| 12 | 21.8 | 7.27 |
| 13 | 7.27 | 21.8 |
| 14 | 21.8 | 21.8 |
| 15 | 29.1 | 14.5 |
| 16 | 14.5 | 29.1 |
| 17 | 29.1 | 29.1 |

TABLE 2

Concentration profiles for individual gases gas 3
and gas 4 and their binary mixtures gas 3 + gas 4.

| Steps | Gas 3 (ppm) | Gas 4 (ppm) |
|---|---|---|
| 1 | 0 | 0 |
| 2 | 7.27 | 0 |
| 3 | 14.5 | 0 |
| 4 | 21.8 | 0 |
| 5 | 29.1 | 0 |
| 6 | 0 | 7.27 |
| 7 | 0 | 14.5 |
| 8 | 0 | 21.8 |
| 9 | 0 | 29.1 |
| 10 | 7.27 | 7.27 |
| 11 | 14.5 | 14.5 |
| 12 | 21.8 | 7.27 |
| 13 | 7.27 | 21.8 |
| 14 | 21.8 | 21.8 |
| 15 | 29.1 | 14.5 |
| 16 | 14.5 | 29.1 |
| 17 | 29.1 | 29.1 |

TABLE 3

Concentration profiles for individual gases gas 1, gas 2, gas 3 and
their ternary mixtures gas 1 + gas 2 + gas 3.

| Steps | Gas 1 (ppm) | Gas 2 (ppm) | Gas 3 (ppm) |
|---|---|---|---|
| 1 | 0 | 0 | 0 |
| 2 | 7.27 | 0 | 0 |
| 3 | 14.5 | 0 | 0 |
| 4 | 21.8 | 0 | 0 |
| 5 | 29.1 | 0 | 0 |
| 6 | 0 | 7.27 | 0 |
| 7 | 0 | 14.5 | 0 |
| 8 | 0 | 21.8 | 0 |
| 9 | 0 | 29.1 | 0 |
| 10 | 0 | 0 | 7.27 |
| 11 | 0 | 0 | 14.5 |
| 12 | 0 | 0 | 21.8 |
| 13 | 0 | 0 | 29.1 |
| 14 | 7.27 | 7.27 | 7.27 |
| 15 | 14.5 | 14.5 | 14.5 |
| 16 | 21.8 | 21.8 | 21.8 |
| 17 | 29.1 | 29.1 | 29.1 |
| 18 | 29.1 | 21.8 | 7.27 |
| 19 | 21.8 | 7.27 | 14.5 |
| 20 | 14.5 | 29.1 | 21.8 |
| 21 | 7.27 | 14.5 | 29.1 |
| 22 | 29.1 | 14.5 | 7.27 |
| 23 | 21.8 | 7.27 | 14.5 |
| 24 | 14.5 | 29.1 | 21.8 |
| 25 | 7.27 | 21.8 | 29.1 |

Example 3

In this example, it is depicted that when a dielectric excitation of a MOS sensor at one or more different excitation operational frequencies and a measured impedance of the MOS sensor response at these different operational frequencies are combined with a dynamic profile of different voltages applied to the MOS sensor heater, unexpected results were observed when different volatiles (gases) were presented to the sensor either with steady-state or with dynamic profiles of gas generations that provided similar results on the ability to differentiate between different gases.

Figure 11:
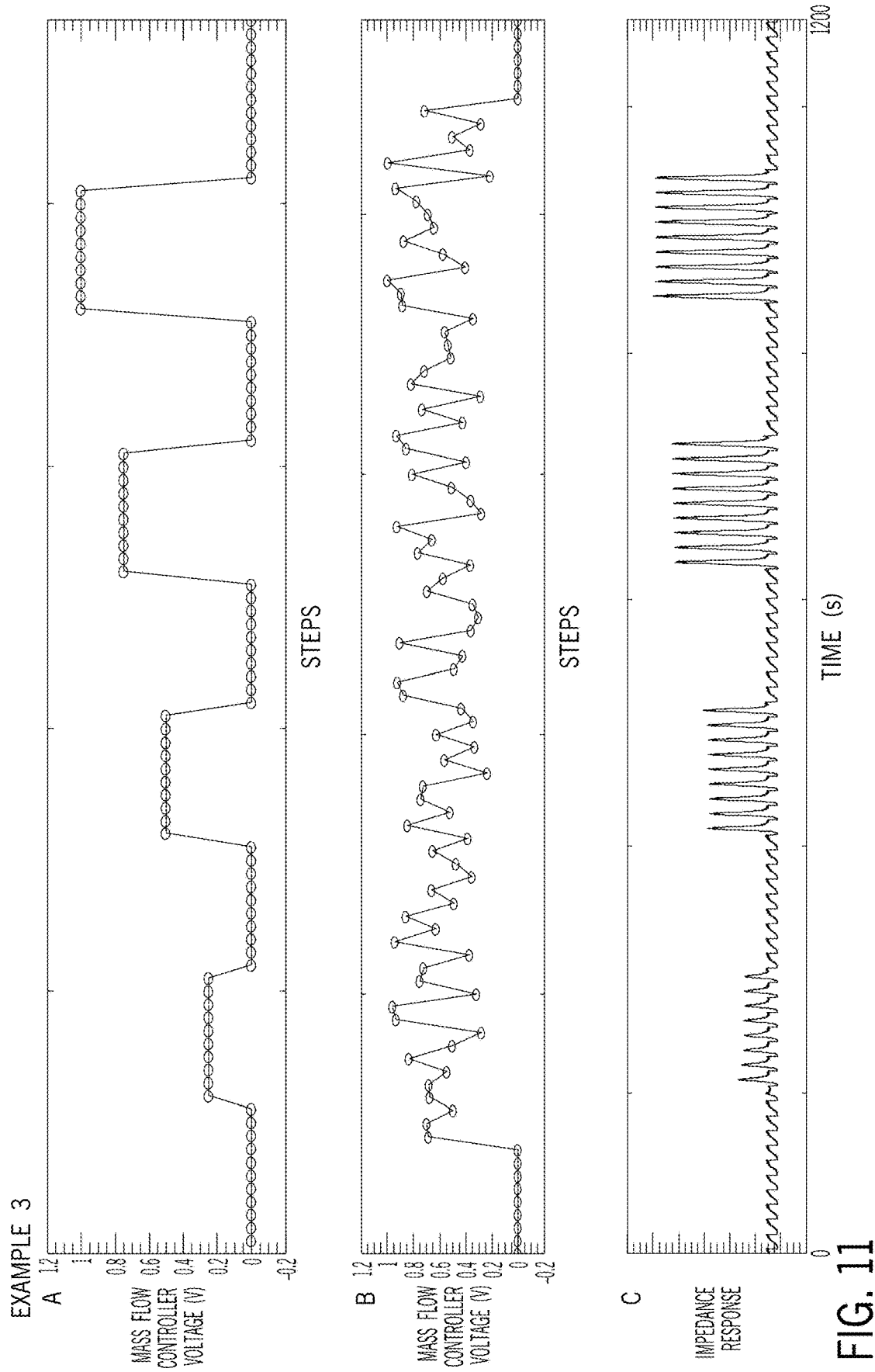
Figure 11:
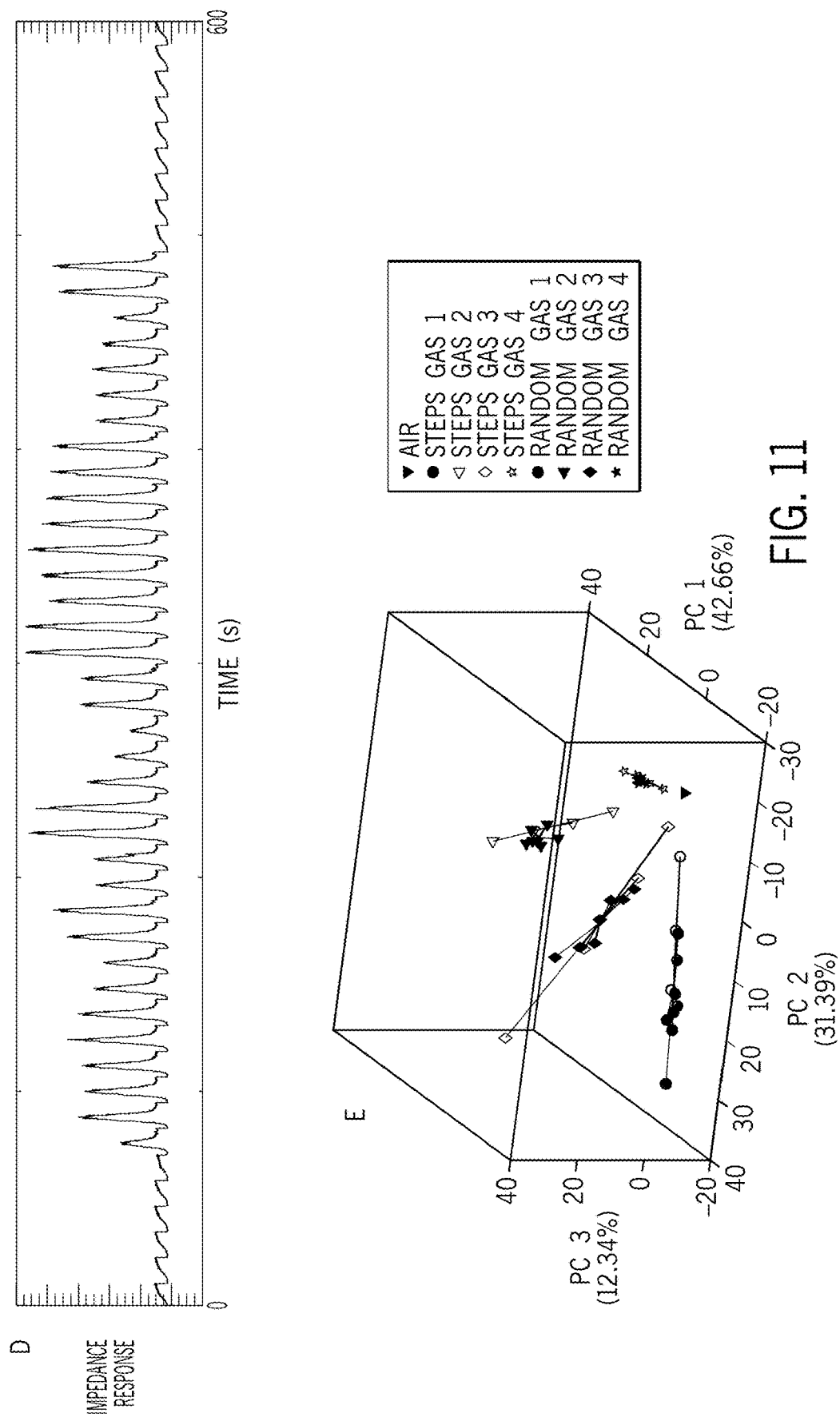

Graph A of FIG. 11 depicts an example of a gas-delivery control file to produce step changes in four gas concentrations where gas concentrations may progressively increase. The duration of step changes in each of gas concentrations may be 100 seconds with the time between step changes in gas concentrations of 100 seconds. Graph B of FIG. 11 depicts an example of a gas-delivery control file to produce random changes in gas concentrations. The duration of time in the gas-delivery control file to produce random changes in gas concentrations may be 400 seconds.

Graph C of FIG. 11 depicts an example of a MOS sensor response using a gas-delivery control file to produce step changes in four gas concentrations where gas concentrations were progressively increased. The total time for a step change in a given gas concentration was 100 seconds and the total time between step changes in gas concentrations was 100 seconds. A heater voltage profile that was applied to the heater of the MOS sensor linearly increased from 1.5 V to 2.5 V over 10 seconds same as depicted in graph A of FIG. 9. This heater voltage profile was repeated sequentially and periodically.

Graph D of FIG. 11 depicts an example of a MOS sensor response using a gas-delivery control file to produce random changes in gas concentrations. The time between each data point in the gas-delivery control file to produce random changes in gas concentrations was 20 seconds with the total time for random changes in gas concentrations of 400 seconds. A heater voltage profile that was applied to the heater of the MOS sensor was the same as applied to the MOS sensor with results depicted in graph C of FIG. 11 and linearly increased from 1.5 V to 2.5 V over 10 seconds as depicted graph A of FIG. 9. This heater voltage profile was repeated sequentially and periodically.

The dynamic signatures of the impedance responses of a MOS sensor to four gases over 10-second temperature cycles when using step changes in gas concentrations may serve as inputs to the PCA tool to differentiate between these four gases. Differentiation between the dynamic signatures of the impedance responses to air and four individual gases over 10-second temperature cycles when four gases were presented to the MOS sensor with step changes in their gas concentrations may be illustrated in graph E of FIG. 11 that depicts a scores plot of a developed PCA model with the open symbols for each of four gases. The step changes in gas concentrations of four gases were acetonitrile (steps gas 1) 7.2, 14.5, 21.8, and 29 ppm, propane (steps gas 2) 7.2, 14.5, 21.8, and 29 ppm, acetone (steps gas 3) 7.2, 14.5, 21.8, and 29 ppm, and methane (steps gas 4) 33.3, 66.7, 100, and 133.3 ppm.

Similarly, the dynamic signatures of the impedance responses of the MOS sensor to four gases over 10-second temperature cycles when using random changes in gas concentrations may serve as inputs to the same PCA tool to differentiate between these four gases. Differentiation between the dynamic signatures of the impedance responses to air and four individual gases over 10-second temperature cycles when four gases were presented to the MOS sensor with random changes in their gas concentrations may be illustrated in graph E of FIG. 11 that depicts a scores plot of a developed PCA model with the solid symbols for each of four gases. The random changes in gas concentrations of four gases were for acetonitrile from 7.2 to 29 ppm (random gas 1), for propane from 7.2 to 29 ppm (random gas 2), for acetone from 7.2 to 29 ppm (random gas 3), and for methane from 33.3 to 133.3 ppm (random gas 4). For plotting results from the random changes in concentrations of four gases, each data point in the PCA plot was the result of averaging of five temperature cycles.

Results for four gases depicted in graph E of FIG. 11 demonstrated that the open and solid symbols for each of four gases clustered together as unique separate categories or directions of the responses in the PCA scores plot. Such clustering of results of each gas demonstrates that the MOS sensor differentiated similarly well between four gases when these four gases were presented to the MOS sensor with step changes in their gas concentrations or with the random changes in gas concentrations of their gas concentrations.

FIG. 11 illustrates graphical illustrations of a gas-delivery control file to produce step changes in gas concentrations, a gas-delivery control file to produce random changes in gas concentrations, a MOS sensor impedance response using a gas-delivery control file to produce step changes in four gas concentrations, a MOS sensor impedance response using a gas-delivery control file to produce random changes in gas concentrations, and differentiation between different four gases when these four gases were presented to the MOS sensor with step changes in their gas concentrations and with the random changes of their gas concentrations, according to embodiments of the disclosed subject matter.

Example 4

In this example we unexpectedly found a substantial sensitivity improvement of a MOS sensor that was operated under its dielectric (AC) excitation and monitoring its imaginary part of impedance $Z''$ that has a known linear response as function of gas concentrations. When gas sensing was performed with a heater operated at two or more different voltages repeatedly applied to the heater, we unexpectedly found that the sensitivity of this MOS sensor was substantially improved as compared to the gas sensing with a heater operated at a constant voltage applied to the heater. As illustrative nonlimiting examples, FIG. 12 depicts enhancement of sensitivity of linear sensor impedance responses for two gases.

Figure 12:
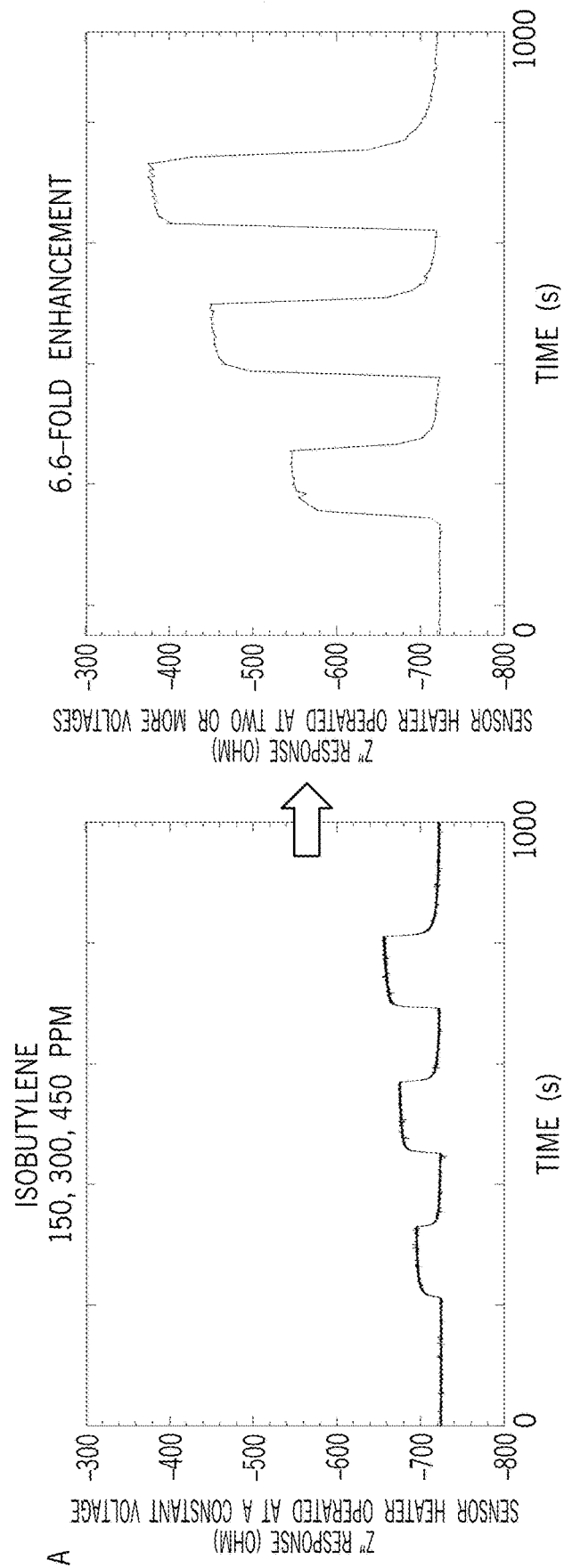
Figure 12:
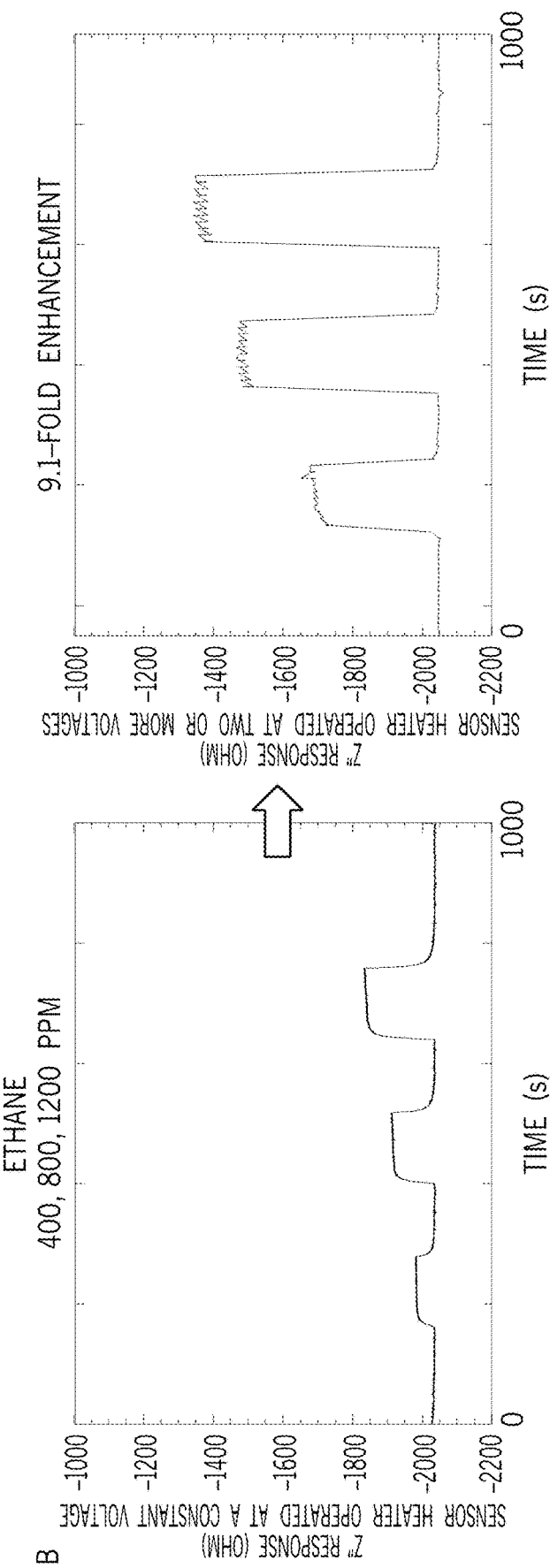

Graph A of FIG. 12 (LEFT) depicts $Z''$ response of a MOS sensor to isobutylene at three concentrations of 150, 300, and 450 ppm in air with a heater operated at a constant voltage of 2.4 V. Graph A of FIG. 12 (RIGHT) depicts $Z''$ response of this MOS sensor to isobutylene at the same three concentrations of 150, 300, and 450 ppm in air and at the same voltage of 2.4 V, but when the heater operated at from 2.0 V to 3.0 V over 10 seconds repeatedly applied to the heater. The temperature increase was performed in 0.5 second steps in 0.05 V increments. By switching from the operation of the MOS sensor heater from a constant operational voltage to the operation of the MOS sensor heater at two or more different operational voltages repeatedly applied to the heater, we achieved a 6.6 times enhancement in the sensitivity of this MOS sensor to isobutylene.

Graph B of FIG. 12 (LEFT) depicts $Z''$ response of a MOS sensor to ethane at three concentrations of 400, 800, and 1200 ppm in air with a heater operated at a constant voltage of 1.8 V. Graph B of FIG. 12 (RIGHT) depicts $Z''$ response of this MOS sensor to ethane at the same three concentrations of 400, 800, and 1200 ppm in air and at the same voltage of 1.8 V, but when the heater operated from 1.5 V to 2.5 V over 10 seconds repeatedly applied to the heater. The temperature increase was performed in 0.5 second steps in 0.05 V increments. By switching from the operation of the MOS sensor heater from a constant operational voltage to the operation of the MOS sensor heater at two or more different operational voltages repeatedly applied to the heater, we achieved a 9.1 times enhancement in the sensitivity of this MOS sensor to ethane. By using this sensitivity-improvement methodology that was applied to a MOS sensor operated under its dielectric (AC) excitation and with a heater operated at two or more different voltages repeatedly applied to the heater, the linearity of the gas-responses of the MOS sensor were the same as compared to the gas sensing with a heater operated at a constant voltage applied to the heater.

FIG. 12 illustrates graphical illustrations of substantial sensitivity improvement of a MOS sensor $Z''$ response when gas sensing was performed with a heater operated at two or more different voltages repeatedly applied to the heater as compared to the gas sensing with a heater operated at a constant voltage, according to embodiments of the disclosed subject matter.

Example 5

In this example we unexpectedly found a substantial reduction of warm up time of MOS sensors that were operated under their dielectric (AC) excitation and monitoring the real part of impedance $Z'$ and/or imaginary part of impedance $Z''$ when gas sensing was performed with a heater operated at two or more different voltages when the voltage was linearly increased from 1.5 V to 2.5 V over 10 seconds repeatedly applied to the heater (also known as time-modulated voltage) as compared to the gas sensing with a heater operated at a constant nominal voltage applied to the heater. A warm up time of a MOS sensor (with other non-limiting terms such as stabilization time, equilibration time, conditioning time, etc.) denotes the amount of time from the MOS sensor is powered to when the MOS sensor has reached the accepted (nominal) performance. Nonlimiting examples of performance include sensor sensitivity, sensor stability, sensor response speed, and any other known in the art. By using the discovered warm up time reduction methodology that was applied to a MOS sensor operated under its dielectric (AC) excitation and with a heater operated at two or more different voltages repeatedly applied to the heater, the linearity of the gas-responses of the MOS sensors was not altered as compared to the gas sensing with a heater operated at a constant voltage.

Figure 13:
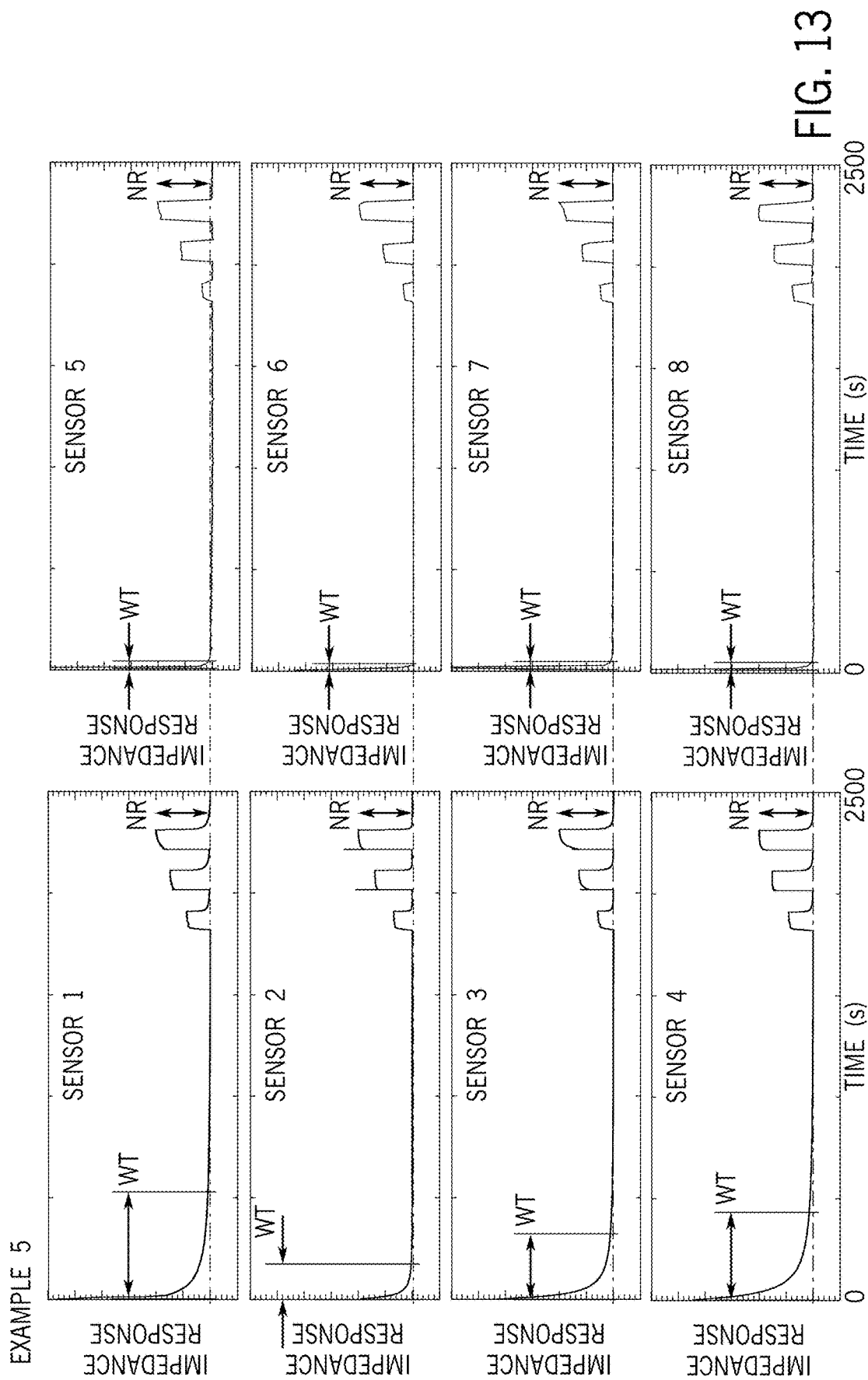

FIG. 13 (LEFT sensors 1-4) depict warm up times and responses of four MOS sensors (1-4) to ethylene oxide as a model gas at concentrations of 10, 20, and 30 ppm from a batch of sensors as shipped from a manufacturer and with each MOS sensor heater operated at a constant voltage applied to the heater. FIG. 13 (RIGHT sensors 5-8) depict warm up times and responses of four other MOS sensors (5-8) to ethylene oxide as a model gas at concentrations of 10, 20, and 30 ppm from a batch of sensors as shipped from a manufacturer and with each MOS sensor heater operated at two or more different voltages applied to the heater which was linearly increased from 1.5 V to 2.5 V over 10 seconds. In FIG. 13 the warm up times of eight MOS sensors are denoted as WT. The responses of eight MOS sensors to the maximum tested gas concentration (ethylene oxide at 30 ppm) have been normalized (denoted as NR) to better compare the warm up times.

Table 4 depicts the summary of warm-up times equal to 98% of the total impedance change in the signal from the start to a stable response for eight MOS sensors. MOS sensors 1-4 were powered using a conventional powering method to a nominal voltage while MOS sensors 5-8 of the same type were powered with a time-modulated voltage. The conventional powering to a nominal voltage resulted in warm-up times ranging from 175 to 539 seconds. The time-modulated voltage resulted in warm-up times down to 11-37 s.

By using this warm up time reduction methodology that was applied to a MOS sensor operated under its dielectric (AC) excitation and with a heater operated at two or more different voltages repeatedly applied to the heater, the linearity of the gas-responses of the MOS sensors were the same as compared to the gas sensing with a heater operated at a constant voltage applied to the heater.

TABLE 4

Summary of warm-up times for eight different MOS sensors of the same type.

| Warm up time of a MOS sensor powered to a constant nominal operational voltage (seconds) | Warm up time of a MOS sensor powered by time-modulated operational voltage (seconds) |
|---|---|
| 539 (MOS sensor 1) | 11 (MOS sensor 5) |
| 175 (MOS sensor 2) | 22 (MOS sensor 6) |
| 317 (MOS sensor 3) | 15 (MOS sensor 7) |
| 432 (MOS sensor 4) | 37 (MOS sensor 8) |

FIG. 13 illustrates graphical illustrations of substantial reduction of warm up time of MOS sensors (5-8) when gas sensing was performed with heaters operated at two or more different voltages repeatedly applied to the heater as compared to gas sensing with MOS sensors (1-4) with heaters operated at a constant voltage, according to embodiments of the disclosed subject matter Example 6

To improve the ability of sensors to differentiate different volatiles, we achieved two-dimensional (2D) orthogonal (independent) response by an individual MOS sensor with its dielectric excitation.

Differentiation of volatiles cannot be achieved with a sensor that has only a single response, for example a resistance response, an electrical current response, a capacitance response, or any other single response by a sensor. Thus, one or more independent variables may be introduced into a sensor response with the goal to provide a one-dimensional, a two-dimensional, or a higher-dimensional response by an individual sensor.

To produce a one-dimensional response of an individual MOS sensor, several techniques may be implemented. One technique is to operate a MOS sensor at a constant operational temperature, to perform dielectric excitation of the MOS sensor at different excitation operational frequencies, and to measure impedance of the MOS sensor response at these different operational frequencies.

Another technique is to operate a MOS sensor at different operational temperatures and to perform measurements of the MOS sensor resistance response. Yet, another technique is to operate a MOS sensor at an ambient temperature without heating and to illuminate the MOS sensor with light at different intensities where the light can be of different wavelengths, for example ranging from the ultraviolet light to infrared light and to perform measurements of the MOS sensor resistance response.

However, conventional resistance measurements of MOS sensor response are non-selected and not preferable because they result in highly non-linear MOS sensor resistance response as a function of concentrations of a measured gas. Such highly non-linear MOS sensor resistance response requires complicated calibration procedure for such MOS sensor with its resistance response and substantially reduces gas-sensitivity of such MOS sensor with its resistance response at relatively high concentrations of the measured gas.

In addition, it was shown that to operate a MOS sensor at different operational temperatures and to perform measurements of the MOS sensor resistance response provides very similar results as compared to operate a MOS sensor at ambient temperature without heating or instead to illuminate the MOS sensor with light at different intensities and to perform measurements of the MOS sensor resistance response.

We unexpectedly discovered that when we operated a MOS sensor at different operational temperatures, illuminated the MOS sensor with light at different intensities, performed dielectric excitation of the MOS sensor at different excitation operational frequencies, and measured impedance of the MOS sensor response at these different operational frequencies, we unexpectedly achieved two-dimensional (2D) orthogonal (independent) response by an individual MOS sensor.

FIG. 14 depicts two-dimensional orthogonal (independent) responses by an individual MOS sensor when the MOS sensor was exposed to methanol, or ethanol, or acetone, or isopropyl alcohol vapors. In this two-dimensional orthogonal (independent) response, the X axis (independent variable A) was the operational voltage (operational temperature) of the heater of the MOS sensor and the Y axis (independent variable B) was the operational intensity of ultraviolet light that illuminated a sensing material of the MOS sensor. The Z-axis was the measured impedance of the MOS sensor response at one of the measured operational frequencies at a given level of the operational voltage of the heater of the MOS sensor at a given level of the operational intensity of ultraviolet light that illuminated the sensing material of the MOS sensor.

Thus, we achieved a two-dimensional (2D) orthogonal (independent) response by an individual MOS sensor that provides the ability of an individual MOS sensor to differentiate different volatiles by performing dielectric excitation of the MOS sensor at one or more different excitation operational frequencies, measuring impedance of the MOS sensor response at one or more different operational frequencies, having two or more levels of the operational voltage of the heater of the MOS sensor, and having two or more levels of the operational intensity of light that illuminates the sensing material of the MOS sensor. This ability of an individual MOS sensor to differentiate different volatiles is an improvement over the conventional non-selected MOS sensor resistance measurements.

FIG. 14 illustrates graphical illustrations of two-dimensional orthogonal (independent) responses by an individual MOS sensor when the MOS sensor was exposed to methanol, or ethanol, or acetone, or isopropyl alcohol vapors, according to embodiments of the disclosed subject matter.

Example 7

We also unexpectedly discovered that when we operated a MOS sensor at different operational temperatures, performed dielectric excitation of the MOS sensor at different excitation operational frequencies, and measured impedance of the MOS sensor response at these different operational frequencies at different operational temperatures, we unexpectedly achieved two-dimensional (2D) orthogonal (independent) response by the individual MOS sensor.

Figure 15:
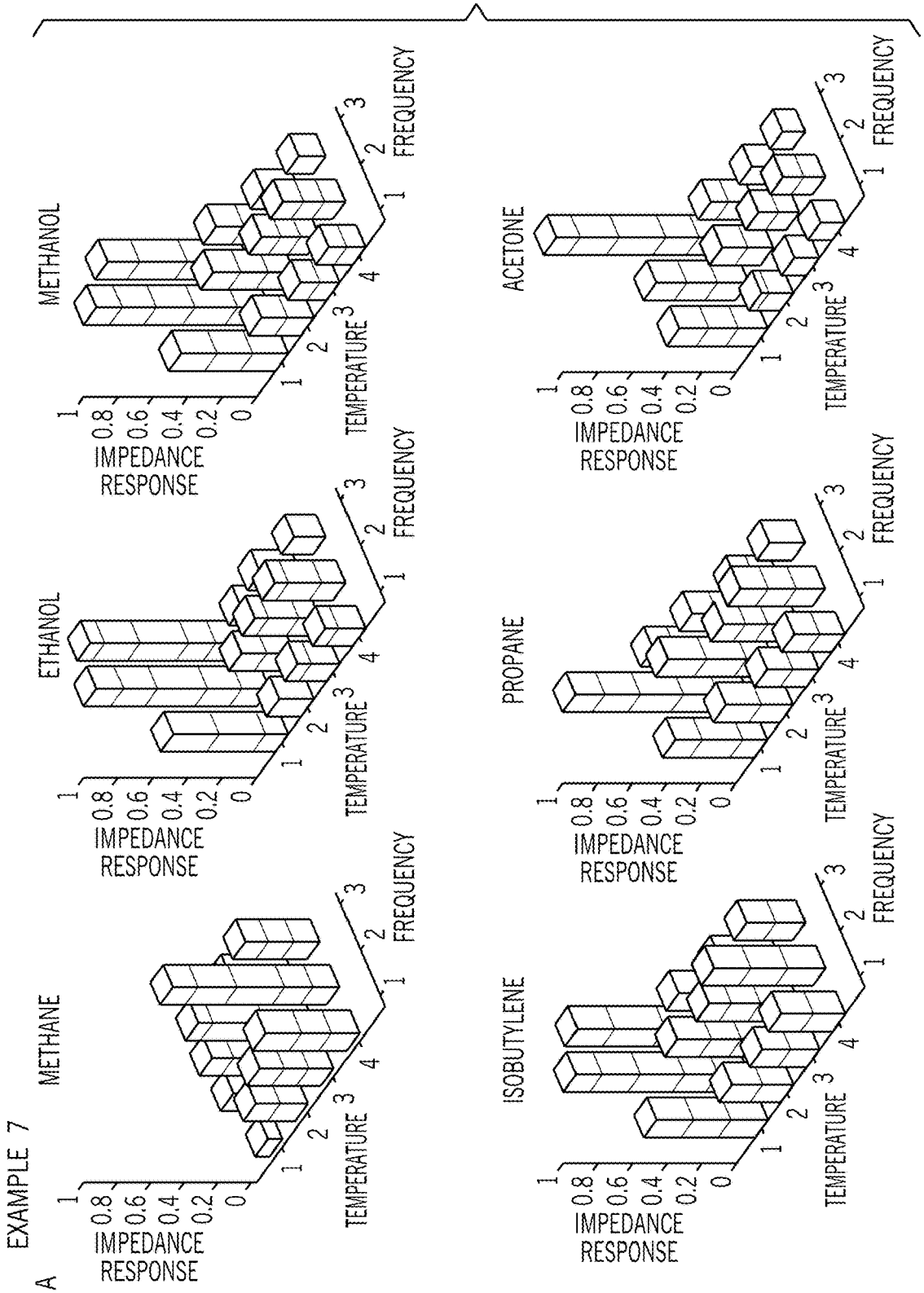

Graph A of FIG. 15 depicts two-dimensional orthogonal (independent) responses by the individual MOS sensor when the MOS sensor was exposed to methane (gas 1), or ethanol (gas 2), or methanol (gas 3), or isobutylene (gas 4), or propane (gas 5), or to acetone (gas 6) and the MOS sensor was operated at four different operational temperatures (1-4) and performed dielectric excitation of the MOS sensor at three different excitation operational frequencies (1-3) and measured impedance of the MOS sensor response at these three different operational frequencies (1-3) at four different operational temperatures (1-4). The term "gas" here is same as "vapor" or "volatile".

Analysis of one-dimensional, two-dimensional, and higher dimensional data sets is often performed to understand, determine, and to extract the key features that describe these data sets. Data sets that are one-dimensional, two-dimensional, or higher dimensional data sets may be also called "spectra".

In this Example 7, the data set for each measured gas is a two-dimensional data set (two-dimensional spectrum) created by the individual MOS sensor when the MOS sensor was operated at four different operational temperatures and performed dielectric excitation of the MOS sensor at three different excitation operational frequencies and measured impedance of the MOS sensor response at these three different operational frequencies at four different operational temperatures.

The one or more key features that describe these data sets may be selected to provide a simplified gas differentiation between the data sets as compared to original one-dimensional, two-dimensional, and higher dimensional data sets. The non-limiting examples of such features (or descriptors) are summarized in Table 5.

TABLE 5

Non-limiting examples of features (descriptors) of 1-D, 2-D, and higher dimensional data sets (spectra).

| Feature | Brief description of the feature |
| --- | --- |
| Spectral Centroid | Frequency-weighted sum normalized by the unweighted sum, also known as Center of Gravity or Center of Mass |

TABLE 5-continued

Non-limiting examples of features (descriptors) of 1-D, 2-D, and higher dimensional data sets (spectra).

| Feature | Brief description of the feature |
| --- | --- |
| Spectral Spread | Standard deviation around the spectral centroid |
| Spectral Skewness | Symmetry around the centroid, computed from the third order moment. |
| Spectral Kurtosis | Flatness, or non-Gaussianity, of the spectrum around its centroid, computed from the fourth order moment |
| Spectral Crest | Ratio of the maximum of the spectrum to the arithmetic mean of the spectrum |
| Spectral Flatness | Ratio of the geometric mean of the spectrum to the arithmetic mean of the spectrum |

Each of the data sets for different gases shown in graph A of FIG. 15 was processed to determine one or more of the features shown in Table 5. As an example, a Spectral Centroid (also known as a Center of Gravity or a Center of Mass) feature was selected to analyze each of the data sets and graph B of FIG. 15 depicts results of distribution of the Spectral Centroids of original spectra of six gases. In graph B of FIG. 15 the units of the X and Y axis are the same as in graph A of FIG. 15.

Thus, we achieved a two-dimensional (2D) orthogonal (independent) response by an individual MOS sensor that differentiates different volatiles by performing dielectric excitation of the MOS sensor at two or more different excitation operational frequencies, measuring impedance of the MOS sensor response at one or more different operational frequencies, having two or more levels of the operational voltage of the MOS sensor, and processing resulting two-dimensional data sets (two-dimensional spectra) to determine one or more of the spectral features, where the nonlimiting examples of spectral features may be a Spectral Centroid, a Spectral Spread, a Spectral Skewness, a Spectral Kurtosis, a Spectral Crest, a Spectral Flatness, and any other known features and/or combinations thereof. The 2D resolution of sensor response was achieved with the first independent variable (frequency of sensor dielectric excitation) and the second independent variable (sensor operational temperature or sensor operation temperature or sensor operating temperature). Graph B of FIG. 15 shows that even two most closely related volatiles such as ethanol (gas 2) and methanol (gas 3) were well separated. Other two closely related volatiles (methane (gas 1) and propane (gas 5)) were also well separated. This ability of an individual MOS sensor to create two-dimensional data sets (two-dimensional spectra) followed by selection of one or more spectral features to differentiate different volatiles is an improvement over the conventional non-selected MOS sensor resistance measurements.

This individual MOS sensor with 2D orthogonal response has the first independent variable such as the frequency of the sensor dielectric excitation and has the second independent variable such as the MOS sensor operational temperature. Operation of the MOS sensor at two or more operational temperatures and with two or more operational frequencies of sensor dielectric excitation also eliminates the MOS sensor drift because the MOS sensor generates baseline-independent unique signatures produced by clean air as compared by produced by any detected volatiles.

These unique signatures are provided in two dimensions of the MOS sensor response, similar to a two-dimensional spectra from orthogonal traditional analytical instruments. Graph C of FIG. 15 depicts an illustrative example of a response from a two-dimensional gas chromatography analytical instrument that has two dimensions of chemical separations shown in graph C of FIG. 15 as the retention time 1 and the retention time 2.

Graphs A and B of FIG. 15 illustrate graphical illustrations of two-dimensional orthogonal (independent) responses by an individual MOS sensor when the MOS sensor was exposed to methane, ethanol, methanol, isobutylene, propane, or acetone and the MOS sensor was operated at four different operational temperatures (1-4) and performed dielectric excitation of the MOS sensor at three different excitation operational frequencies (1-3), and results of distribution of the Spectral Centroids of original spectra of six gases, according to embodiments of the disclosed subject matter.

Example 8

In this example we unexpectedly found a drift-correction methodology that we applied to an individual MOS sensor when operated under its dielectric AC excitation and with a dynamic profile of different voltages applied to the MOS sensor heater as depicted in graph A of FIG. 9. The MOS sensor impedance response at one operational frequency upon exposures to ethylene oxide gas at three concentrations of 16.7, 33.3, and 50 ppm and upon exposures to air over the test time of 23 hours is illustrated in graph A of FIG. 16 showing the linear sensor response as a function of ethylene oxide concentrations because MOS sensors under their dielectric AC excitation have known linear response.

Graph B of FIG. 16 depicts a region from graph A of FIG. 16 that is zoomed to the MOS sensor impedance response in air and to the MOS sensor impedance response to the first ethylene oxide concentration of 16.7 ppm to depict an upward baseline drift of the MOS sensor impedance response over the test time of 23 hours. There are four regions highlighted in graph B of FIG. 16 such as 1, 1*, 2, and 2*. Regions 1 and 2 are the MOS sensor impedance responses in air in the beginning and close to the end of the 23 h test, respectively. Regions 1* and 2* are the MOS sensor impedance responses to 16.7 ppm of ethylene oxide in the beginning and close to the end of the depicted 23 h test, respectively; close to times of 1 and 2, respectively.

Graph C of FIG. 16 depicts temperature-modulated signatures of regions 1 and 2 of the MOS sensor impedance response to air. These temperature-modulated signatures of the MOS sensor impedance response to air were the same but were off-set vertically, following the trend shown in graph B of FIG. 16. Similarity, graph D of FIG. 16 depicts temperature-modulated signatures of the MOS sensor impedance response to 16.7 ppm of ethylene oxide in the beginning and close to the end of the 23 h test, respectively (regions 1* and 2*). These temperature-modulated signatures of the MOS sensor impedance response to 16.7 ppm of ethylene oxide were the same but were also off-set vertically, following the trend shown in graph B of FIG. 16.

Thus, we found that the shapes of the temperature-modulated signatures of the MOS sensor impedance response to air and to a gas of interest were not affected by the sensor drift and these shapes were the same in the beginning of the test and at the end of the test when the sensor experienced drift of baseline and drift of gas-response.

Thus, the shapes of the temperature-modulated signatures of the MOS sensor impedance response in air and when exposed to a gas of interest were independent from the sensor drift. Using the shapes of the temperature-modulated signatures of the MOS sensor impedance response that are independent of the vertical positions of the MOS sensor impedance response may provide the drift-independent MOS sensor impedance response or self-correction for sensor drift.

FIG. 16 illustrates graphical illustrations of a MOS sensor impedance response at one operational frequency upon exposures to ethylene oxide gas and to air using a dynamic profile of different voltages applied to the MOS sensor heater, according to embodiments of the disclosed subject matter.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising," "including," or "having" (or like terms) an element, which has a particular property or a plurality of elements with a particular property, may include additional such elements that do not have the particular property.

As used herein, terms such as "system" or "controller" may include hardware and/or software that operate(s) to perform one or more functions. For example, a system or controller may include a computer processor or other logic-based device that performs operations based on instructions stored on a tangible and non-transitory computer readable storage medium, such as a computer memory. Alternatively, a system or controller may include a hard-wired device that performs operations based on hard-wired logic of the device. The systems and controllers shown in the figures may represent the hardware that operates based on software or hardwired instructions, the software that directs hardware to perform the operations, or a combination thereof.

As used herein, terms such as "operably connected," "operatively connected," "operably coupled," "operatively coupled," "operationally contacted," "operational contact" and the like indicate that two or more components are connected in a manner that enables or allows at least one of the components to carry out a designated function. For example, when two or more components are operably connected, one or more connections (electrical and/or wireless connections) may exist that allow the components to communicate with each other, that allow one component to control another component, that allow each component to control the other component, and/or that enable at least one of the components to operate in a designated manner.

It is to be understood that the subject matter described herein is not limited in its application to the details of construction and the arrangement of elements set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the presently described subject matter without departing from its scope. While the dimensions, types of materials and coatings described herein are intended to define the parameters of the disclosed subject matter, they are by no means limiting and are exemplary embodiments. Many other embodiments will be apparent to one of ordinary skill in the art upon reviewing the above description.

The scope of the subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the present subject matter, and also to enable one of ordinary skill in the art to practice the embodiments of the disclosed subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A sensor system comprising:
a sensing element comprising a substrate, sensing electrodes supported by the substrate, a sensing material over the sensing electrodes, and a multi-energy-delivering element coupled to the sensing material and configured to deliver different types of operational energy to the sensing material;
excitation and detection circuitry coupled to the sensing electrodes and the multi-energy-delivering element; and
a controller coupled to the excitation and detection circuitry, wherein the controller is configured to cause the excitation and detection circuitry to achieve multi-gas differentiation with one-, two-, or higher-dimensional detection by
applying an alternating current through the sensing electrodes at one or more operational frequencies for excitation of the sensing material, and
applying at least one type of operational energy to the sensing material via the multi-energy-delivering element, wherein the at least one type of operational energy has at least two levels.

2. The sensor system of claim 1, wherein the multi-energy-delivering element produces a combination of one or more of thermal, radiant, or acoustic types of energy.

3. The sensor system of claim 1, wherein the multi-energy-delivering element produces a combination of two or more of thermal, radiant, or acoustic types of energy.

4. The sensor system of claim 1, where:
a 1st dimension is selected from one of three types of operational energy such as thermal, radiant, or acoustic; one or both of a 2nd or 3rd dimension is selected from other types of operational energy such as thermal, radiant, or acoustic and is not the same as the 1st dimension;
and
wherein the alternating current is applied through the sensing electrodes at the one or more operational frequencies for excitation of the sensing material.

5. The sensor system of claim 1, wherein the excitation and detection circuitry is configured to achieve multi-dimensional detection that achieves differentiation between multiple analyte gases, or achieves quantification of multiple analyte gases, or achieves sensitivity of the sensor to the different analyte gases, or achieves stable baseline of the sensor, or achieves short warm-up time of the sensor or a combination thereof.

6. The sensor system of claim 1, wherein repeatedly applying at least two different operational energy levels to the multi-energy-delivering element comprises sequentially and periodically applying at least two different operational energy levels to the multi-energy-delivering element.

7. The sensor system of claim 1, wherein the sensing material comprises a metal oxide semiconductor material.

8. The sensor system of claim 1, wherein the multi-energy-delivering element produces a heat type of energy.

9. A method comprising:
repeatedly applying, by a controller, at least two different operational voltages to a heater of a sensor system;
continuously applying, by the controller, alternating current through sensing electrodes at one or more operational frequencies of the sensor system for excitation of sensing material of the sensor system;
measuring gas responses of the sensing material, by the controller, under the excitation with the alternating current through the sensing electrodes at the one or more operational frequencies at a first operational voltage that is applied to the heater;
measuring additional gas responses of the sensing material, by the controller, under the excitation with the alternating current through the sensing electrodes at the one or more operational frequencies at a second operational voltage that is applied to the heater;
detecting gas, by the controller, based on repeatedly applying at least the two different operational voltages to the heater and continuously applying the alternating current through the sensing electrodes at the one or more operational frequencies for excitation of the sensing material; and
achieving differentiation, by the controller, between multiple gases.

10. The method of claim 9 comprising: achieving quantification, by the controller, of the multiple gases.

11. The method of claim 9 comprising:
achieving sensitivity, by the controller, of the sensor system to different analyte gases.

12. The method of claim 9 comprising:
achieving stable baseline, by the controller, of the sensor system during differentiation and quantification of different analyte gases.

13. The method of claim 9 comprising:
achieving, by the controller, short warm-up time of the sensor system.

14. The method of claim 9, wherein warm-up time of the sensor system is in a range from about 10 seconds to about 300 seconds.

15. The method of claim 9, wherein warm-up time of the sensor system is in a range from about 10 seconds to about 60 seconds.

16. The method of claim 9, wherein repeatedly applying at least two different operational voltages to the heater comprises sequentially and periodically applying the at least two different operational voltages to the heater.

17. The method of claim 9, wherein an improved response stability is achieved with a reduced power consumption as compared to non-selected responses from the sensing material by operating with a nominal operational voltage applied to the heater and at a below-nominal operational voltage applied to the heater, wherein non-selected responses from the sensing material comprise resistance measurement responses from the sensing material.

18. A sensing system comprising:
- a sensing element comprising a substrate, sensing electrodes supported by the substrate, sensing material over the sensing electrodes, and a heater supported by the substrate;
- an excitation and detection circuitry coupled to the sensing electrodes and the heater; and
- a controller coupled to the excitation and detection circuitry, wherein the controller is configured to cause the excitation and detection circuitry to achieve multi-gas differentiation with one-, two-, or higher-dimensional detection by
- repeatedly applying at least two different operational voltages to the heater, and applying an alternating current through the sensing electrodes at one or more operational frequencies for excitation of the sensing material.

19. The sensing system of claim 18, wherein repeatedly applying at least two different operational voltages to the heater comprises sequentially and periodically applying the at least two different operational voltages to the heater.

20. The sensing system of claim 18, wherein the sensing material comprises a metal oxide semiconductor material.

21. The sensing system of claim 20, wherein the metal oxide semiconductor material comprises a single-metal oxide, a metal oxide with two differently sized cations, a metal oxide formed as 0-D, 1-D, 2-D, or 3-D nanostructures, or a metal oxide formed as nanoparticles, nanowires, nanotubes, nanobelts, nanosheets, or nanocubes.

22. The sensing system of claim 18, wherein an improved response stability is achieved with a reduced power consumption as compared to non-selected responses from the sensing material by operating with a nominal operational voltage applied to the heater and at a below-nominal operational voltage applied to the heater, wherein non-selected responses from the sensing material comprise resistance measurement responses from the sensing material.

23. The sensing system of claim 18, wherein an improved multi-gas differentiation is achieved by repeatedly applying at least two different operational voltages to the heater and analyzing real and imaginary responses of an impedance spectra of the sensing material as compared to non-selected responses from the sensing material, wherein non-selected responses from the sensing material comprise resistance measurement responses from the sensing material.

\* \* \* \* \*